(12) United States Patent
Jewell-Larsen et al.

(10) Patent No.: US 8,466,624 B2
(45) Date of Patent: Jun. 18, 2013

(54) ELECTROHYDRODYNAMIC FLUID ACCELERATOR DEVICE WITH COLLECTOR ELECTRODE EXHIBITING CURVED LEADING EDGE PROFILE

(75) Inventors: Nels Jewell-Larsen, Campbell, CA (US); Kenneth A. Honer, Santa Clara, CA (US); Matt Schwiebert, Cupertino, CA (US); Hongyu Ran, Mountain View, CA (US); Piyush Savalia, San Jose, CA (US); Yan Zhang, San Jose, CA (US)

(73) Assignee: Tessera, Inc., San Jose, CA (US)

( * ) Notice: Subject to any disclaimer, the term of this patent is extended or adjusted under 35 U.S.C. 154(b) by 877 days.

(21) Appl. No.: 12/553,688

(22) Filed: Sep. 3, 2009

(65) Prior Publication Data
US 2010/0052540 A1  Mar. 4, 2010

Related U.S. Application Data

(60) Provisional application No. 61/094,028, filed on Sep. 3, 2008.

(51) Int. Cl.
*H05B 31/26* (2006.01)

(52) U.S. Cl.
USPC .............. 315/111.91; 315/500; 315/506

(58) Field of Classification Search
USPC ............. 315/111.21, 111.31, 111.61, 111.91, 315/500, 505, 506
See application file for complete search history.

(56) References Cited

U.S. PATENT DOCUMENTS

| | | | |
|---|---|---|---|
| 4,812,711 A * | 3/1989 | Torok et al. | 315/111.91 |
| 6,504,308 B1 * | 1/2003 | Krichtafovitch et al. | 315/111.91 |
| 7,248,003 B2 * | 7/2007 | Krichtafovitch | 315/506 |
| 7,652,431 B2 * | 1/2010 | Krichtafovitch | 315/111.91 |
| 2004/0183454 A1 * | 9/2004 | Krichtafovitch | 315/111.91 |
| 2008/0175720 A1 * | 7/2008 | Schlitz et al. | 417/48 |
| 2008/0199208 A1 | 8/2008 | Schlitz | |
| 2009/0155090 A1 | 6/2009 | Schlitz | |

OTHER PUBLICATIONS

Jewell-Larsen, N.E., et al., "Electrohydrodynamic (EHD) Cooled Laptop", 25th IEEE Semi-Therm Symposium, Mar. 2009, 7 pages.

* cited by examiner

*Primary Examiner* — Tung X Le
(74) *Attorney, Agent, or Firm* — Zagorin O'Brien Graham LLP

(57) ABSTRACT

Performance of an electrohydrodynamic fluid accelerator device may be improved and adverse events such as sparking or arcing may be reduced based, amongst other things, on electrode geometries and/or positional interrelationships of the electrodes. For example, in a class of EHD devices that employ a longitudinally elongated corona discharge electrode (often, but not necessarily, a wire), a plurality of generally planar, collector electrodes may be positioned so as to present respective leading surfaces toward the corona discharge electrode. The generally planar collector electrodes may be oriented so that their major surfaces are generally orthogonal to the longitudinal extent of the corona discharge electrode. In such EHD devices, a high intensity electric field can be established in the "gap" between the corona discharge electrode and leading surfaces of the collector electrodes.

21 Claims, 13 Drawing Sheets

ELECTROHYDRODYNAMIC FLUID ACCELERATOR DEVICE WITH COLLECTOR ELECTRODE EXHIBITING CURVED LEADING EDGE PROFILE

CROSS-REFERENCE TO RELATED APPLICATION(S)

The present application claims the benefit of U.S. Provisional Application No. 61/094,028, filed Sep. 3, 2008.

BACKGROUND

1. Field

The present application relates to the thermal management, and more particularly, to micro-scale cooling devices that use electrohydrodynamic (EHD, also known as electro-fluid-dynamic, EFD) technology to generate ions and electrical fields to control the movement of fluids, such as air, as part of a thermal management solution to dissipate heat.

2. Related Art

In general, electrohydrodynamic (EHD) technology uses corona discharge principles to move fluids (e.g., air molecules). Basic principles of EHD fluid flow are reasonably well understood by persons of skill in the art. Accordingly, a brief illustration corona discharge principles in a simple two electrode system sets the stage for the more detailed description that follows.

With reference to the illustration in FIG. 1, corona discharge principles include applying a high intensity electric field between a first electrode 10 (often termed the "corona electrode," the "corona discharge electrode," the "emitter electrode" or just as the "emitter") and a second electrode 20. Fluid molecules, such as surrounding air molecules, near the corona discharge region 18 become ionized and form a stream 14 of ions 16 that accelerate toward second electrode 20, colliding with neutral fluid molecules 22. During these collisions, momentum is imparted from the stream 16 of ions 14 to the neutral fluid molecules 22, inducing a corresponding movement of fluid molecules 22 in a desired fluid flow direction, denoted by arrow 2, toward second electrode 20. Second electrode 20 is variously referred to as the "accelerating", "attracting", "collector" or "target" electrode. While stream 14 of ions 16 are attracted to, and neutralized by, second electrode 20, neutral fluid molecules 22 move past second electrode 20 at a certain velocity. The movement of fluid produced by corona discharge principles has been variously referred to as "electric," "corona" or "ionic" wind and has been defined as the movement of gas induced by the repulsion of ions from the vicinity of a high voltage discharge electrode.

Devices built using the principle of the ionic movement of a fluid are variously referred to in the literature as ionic wind machines, electric wind machines, corona wind pumps, electrostatic air accelerators, electro-fluid-dynamics (EFD) devices, electrostatic fluid accelerators (EFA), electrohydrodynamic (EHD) thrusters and EHD gas pumps. Some aspects of the technology have also been exploited in devices referred to as electrostatic air cleaners or electrostatic precipitators.

In the present application, embodiments of the devices illustrated and described herein are referred to as electrohydrodynamic fluid accelerator devices, also referred to in an abbreviated manner herein as "EHD devices", and are utilized as a component in a thermal management solution to dissipate heat generated by an electronic circuit.

SUMMARY

It has been discovered that performance of an electrohydrodynamic fluid accelerator device may be improved and adverse events such as sparking or arcing may be reduced based, amongst other things, on electrode geometries and/or positional interrelationships of the electrodes. For example, in a class of EHD devices that employ a longitudinally elongated corona discharge electrode (often, but not necessarily, a wire), a plurality of generally planar, collector electrodes may be positioned so as to present respective leading surfaces toward the corona discharge electrode. The generally planar collector electrodes may be oriented so that their major surfaces are generally orthogonal to the longitudinal extent of the corona discharge electrode. In such EHD devices, a high intensity electric field can be established in the "gap" between the corona discharge electrode and leading surfaces of the collector electrodes.

In general, it can be desirable to decrease the gap distance so as to increase intensity of the ionizing electric field near the corona discharge electrode. However, at the same time, it can be desirable to "spread" that field over a comparatively large surface of the collector electrodes. In this way, EHD device designs seek to maximize intensity of the ionizing electric field while minimizing arcing between corona discharge and collector electrodes. In the EHD device configuration previously introduced, the respective leading surfaces of the collector electrodes present comparatively large surfaces. In an attempt to spread the field evenly over such leading surfaces, designs have been proposed in which such leading surface present a circular profile such that all points on the surface are equidistant from a corona discharge electrode positioned at a distance equal to the radius of the circular profile.

While such configurations have some intuitive appeal, it has been discovered that performance may be improved in configurations in which a curved leading surface presents a nearest point at a minimum distance, $D_{min}$, from the corona discharge electrode and in which additional points in either direction away therefrom along the curved leading surface are at increasing distance, $d(\theta) > D_{min}$. In some configurations, the presented curvature is non-circular, such as in the case of certain parabolic, elliptical, caternary or other curved profiles in which the increasing distance constraint is maintained. In some configurations, curvature presented by the leading surface of a collector electrode may even be circular as long as electrode positioning is such that minimum distance, $D_{min}$, is less than the radius of circular curvature.

Building on the foregoing, we present a variety of embodiments. In some embodiments, collector electrodes of the EHD device are themselves thermally coupled to a heat source such that at least some surfaces thereof act as fins of a heat exchanger. In some embodiments, the EHD device motivates flow of a fluid (typically air) past a heat exchanger that is distinct from the collector electrodes. In some embodiments, multiple EHD device instances are ganged and/or staged so as to increase volume of flow, pressure or both. These and other embodiments will be understood with reference to the description that follows and with respect to the appended claims.

BRIEF DESCRIPTION OF THE DRAWINGS

The description of illustrative embodiments will be understood when read in connection with the accompanying drawings. Drawings are not necessarily to scale; emphasis has instead been placed upon illustrating the structural and fabrication principles of the described embodiments.

FIG. 13A is a simulation plot of electric field strength and equipotential lines for a representative configuration in which a collector electrode having a generally circular curved leading surface profile is paired with a corona discharge electrode positioned equidistant from all points along the curved leading surface of the collector electrode. FIG. 13B is a simulation plot of equipotential lines for an alternative configuration of a collector electrode having a generally circular curved leading surface profile paired with a corona discharge electrode of differing geometry. Finally, FIG. 13C is a simulation plot of equipotential lines for a configuration in which a collector electrode presents a generally parabolic leading surface profile.

FIG. 15 illustrates a generally parabolic leading surface profile for which points at increasing angular distance are at increasing positional distance from a corona discharge electrode. FIG. 16 illustrates a generally elliptical leading surface profile for which points at increasing angular distance are at increasing positional distance from a corona discharge electrode. FIG. 17 illustrates a generally curved leading surface profile displaced from a corona discharge electrode so that points at increasing angular distance along a collector electrode are at increasing distance from the corona discharge electrode. FIG. 18 illustrates a circular leading surface profile having a radius of curvature substantially greater than a minimum distance between corona discharge and collector electrodes.

The use of the same reference symbols in different drawings indicates similar or identical items.

DETAILED DESCRIPTION

Figure 1:
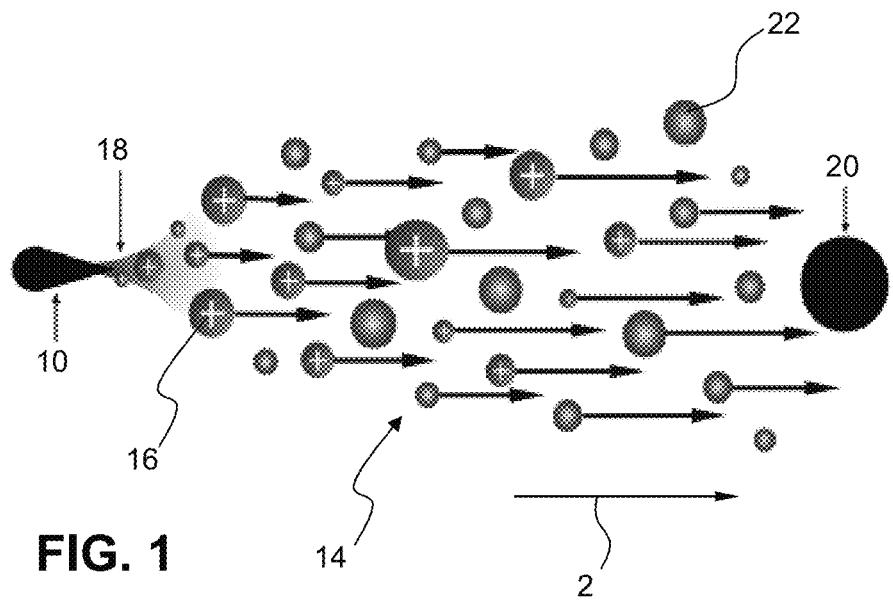
FIG. 1 is a graphical depiction of certain basic principles of corona-induced electrohydrodynamic (EHD) fluid flow.

Geometries and/or positional interrelationships of the electrodes of an electrohydrodynamic fluid accelerator device (hereafter an EHD device) have been studied together with the electric fields that may be established during device operation. Based, in part, on insights developed, candidate geometries and/or positional interrelationships have been adapted to generally improve performance and/or reduce incidence of adverse events in such EHD devices. For example, in some embodiments in accordance with the present invention, specific geometries and/or positional interrelationships of corona discharge and collector electrodes are employed in which points that are at increasing angular distance, $\theta$, from a dominant fluid flow direction along curved leading surfaces of respective collector electrodes are at increasing distance, $d(\theta)$, from a corona discharge electrode.

In general, a variety of curved leading surface profiles are envisioned for collector electrodes, together with a variety of positional interrelationships between corona discharge and collector electrodes of an EHD device. For concreteness of description, we focus on certain illustrative embodiments and certain illustrative surface profiles and positional interrelationships. For example, in much of the description herein, plural planar collector electrodes are arranged in a parallel, spaced-apart array proximate to a corona discharge wire that is displaced from curved leading surfaces of the respective collector electrodes. Likewise, in some embodiments, planar portions of the collector electrodes are oriented generally orthogonally to the longitudinal extent of the corona discharge wire. In some embodiment, collector electrodes of an EHD device act as heat exchanger fins and are thermally coupled to a heat source, typically an electrical assembly or semiconductor integrated circuit, and typically by one or more heat pipes. In some embodiments, an EHD device may motivate fluid flow past a separate heat exchanger. In some embodiments, multiple EHD device instances are staged, ganged, or staged and ganged to provide a composite EHD device.

Of course, these embodiments are merely illustrative and, notwithstanding the particular context in which any particular embodiment is introduced, persons of ordinary skill in the art having benefit of the present description will appreciate a wide range of design variations and exploitations for the developed techniques and configurations. Moreover, reference to particular materials; dimensions, electrical field strengths; exciting voltages, currents and/or waveforms; packaging or form factors, thermal conditions, loads or heat transfer conditions and/or system designs or applications is merely illustrative. In view of the foregoing and without limitation on the range of designs encompassed within the scope of the appended claims, we now describe certain illustrative embodiments Electrohydrodynamic (EHD) Fluid Acceleration, Generally Basic principals of electrohydrodynamic (EHD) fluid flow are well understood in the art and, in this regard, an article by Jewell-Larsen, N. et al., entitled "Modeling of corona-induced electrohydrodynamic flow with COMSOL multiphysics" (in the *Proceedings of the ESA Annual Meeting on Electrostatics* 2008) (hereafter, "the Jewell-Larsen Modeling article"), provides a useful summary. Likewise, U.S. Pat. No. 6,504,308, filed Oct. 14, 1999, naming Krichtafovitch et al. and entitled "Electrostatic Fluid Accellerator" describes certain electrode and high voltage power supply configurations useful in some EHD devices. U.S. Pat. No. 6,504,308, together with sections I (Introduction), II (Background), and III (Numerical Modeling) of the Jewell-Larsen Modeling article are hereby incorporated by reference herein for all that they teach.

Note that the simple illustration of corona-induced electrohydrodynamic fluid flow shown in FIG. 1 (which has been adapted from the Jewell-Larsen Modeling article and discussed above) includes shapes for first electrode 10 and second electrode 20 that are particular to the simple illustration thereof. Likewise, the electrode configurations illustrated in U.S. Pat. No. 6,504,308 and aspects of the power supply design are particular thereto. Accordingly, such illustrations, while generally useful for context, are not intended to limit the range of possible electrode or high voltage power supply designs in any particular embodiment of the present invention.

An Illustrative EHD Device

Figure 2:
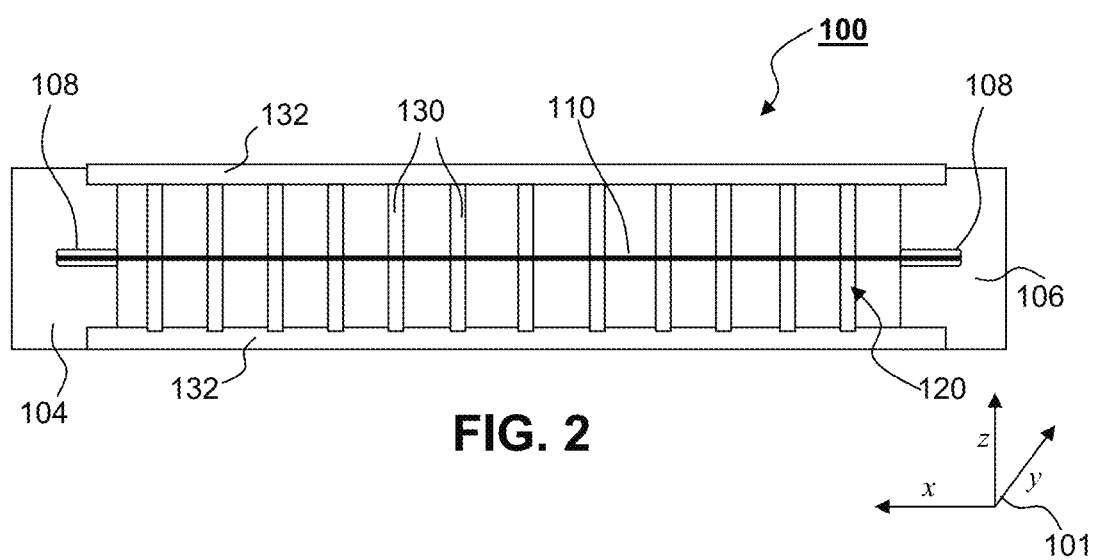
FIG. 2 is a side view of an EHD device in accordance with some embodiments of the present invention.

FIG. 2 is a front, side view of an EHD device in accordance with some embodiments of the present invention. EHD device 100 will be understood relative to a three-dimensional coordinate system 101 in which the x-y plane respectively designates the width and depth of device 100 and the z direction (into the page) designates the height, h, of device 100. In FIG. 2, device 100 motivates flow of a fluid in the y direction; that is, fluid is drawn into the first, or front, surface of device 100 shown in FIG. 2 and typically exits a rear surface, opposite the first surface, not shown in FIG. 2.

In the configuration illustrated, EHD device 100 comprises first and second opposing frame members 104 and 106 that function to hold, or support, corona discharge electrode 110 and collector electrode array 120. Frame members 104 and 106 may be fabricated of a dielectric material in order to provide electrical isolation from other components of EHD device 100. Corona discharge electrode 110 in device 100 has a small radius of curvature and, in some embodiments, may take the form of a wire or rod. Other shapes for corona discharge electrode 110 are also possible; for example, corona discharge electrode 110 may take the shape of barbed wire, a band, blade or place that, in some embodiments, may present a knife- or serrated-edge. In some embodiments, a cross-section such as illustrated in FIG. 1 for electrode 10 may be employed. Typically, a small radius of curvature or sharp point tends to facilitate ion production at an appropriate point when high voltage is applied.

In general, corona discharge electrode 110 may be fabricated in a wide range of materials. For example, in some embodiments, compositions such as described in U.S. Pat. No. 7,157,704, filed Dec. 2, 2003, entitled "Corona Discharge Electrode and Method of Operating the Same" and naming Krichtafovitch et al. as inventors may be employed. U.S. Pat. No. 7,157,704 is incorporated herein for the limited purpose of describing materials for some corona discharge electrodes that may be employed in some embodiments. In general, a high voltage power supply (not specifically shown) creates the electric field between corona discharge electrode 110 and collector electrode array 120.

In the embodiment of FIG. 2, frame members 104 and 106 include a pair of curved recesses 108, generally conformal with an end portion of corona discharge electrode 110. Each opposing end of corona discharge electrode 110 passes through a respective recess 108 and is attached to an interior portion (not shown) of a respective frame member. Recess 108 provides a transition region for corona discharge electrode 110 to pass through from its positioning proximate to collector electrode array 120 and one of frame members 104 and 106. The transition region eliminates the sharp points that may occur at an abrupt junction between corona discharge electrode 110 and its respective frame member, thereby reducing arcing and other undesirable effects in the surrounding high electric field created during operation of EHD device 100.

With continued reference to FIG. 2, collector electrode array 120 comprises a plurality of substantially parallel unit structures 130 attached to a pair of parallel and substantially flat, spaced apart support members 132. Each unit structure 130 functions as a collector electrode and may generally have greater depth (in the y direction) than width (in the x direction). Unit structures 130 may be fabricated of any suitable metal material, such as aluminum or copper. The number of, and distance between, unit structures 130 in collector array 120 may vary according to device specifications. Unit structures 130 are generally planar and present a curved leading surface exposed toward corona discharge electrode 110. In some embodiments, unit structures 130 include a generally rectangular extent in the direction of fluid flow (the y direction), although, more generally, may be formed in other shapes.

Figure 3A:
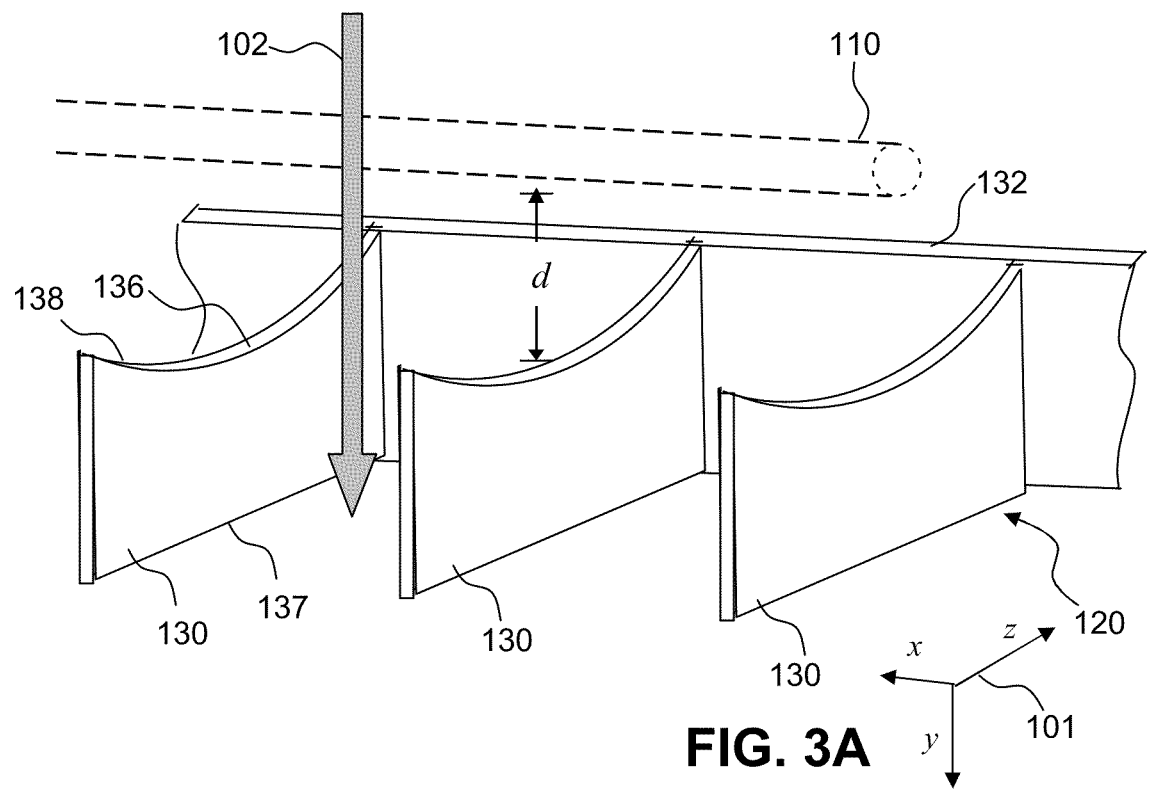
FIG. 3A is a partial cross-sectional perspective view, in accordance with some embodiments of the present invention, of a collector electrode geometry that may be employed by the EHD device illustrated in FIG. 2.

FIG. 3A illustrates a partial cross-sectional perspective view, in accordance with some embodiments of the present invention, of a collector electrode array that may be employed by the EHD device illustrated in FIG. 2. More specifically, FIG. 3A illustrates several adjacent unit structures 130 of collector electrode array 120. For simplicity of description (and generality with respect to alternative EHD device configurations), such unit structures 130 are hereafter referred to as collector electrodes 130, although persons of ordinary skill in the art will immediately recognize that, in some configurations, additional structures (such as support members 132 illustrated in FIGS. 2, 3A and 3B) may be electrically conductive and act as part of an overall "collector electrode." In view of the foregoing, we now turn to the generally curved leading surface(s) 136 of collector electrodes 130.

Fluid flow through collector electrode array 120 is generally in the direction of arrow 102. In the embodiment shown in FIG. 3A, collector electrodes 130 are substantially rectangular in shape, having a leading edge 138 disposed closest to corona discharge electrode 110 and a trailing edge 137 opposite to leading edge 138. Leading edge 138 includes a contoured or curved surface 136. As will be understood by persons of ordinary skill in the art, consistent with principles of high voltage design, curved leading surface 136 is intended to present generally curvaceous surface contours toward corona discharge electrode 110 and any sharp exposed edges are merely an artifact of the illustration and cross section of FIG. 3A. Corona electrode 110 is shown positioned a distance, d, above collector electrodes 130. Distance d may sometimes be referred to as the "gas gap" or "air gap."

EHD device 100 may be constructed in a variety of sizes, and thus is suitable for a variety of thermal management applications involving the cooling of electronic circuits. In one exemplary implementation of EHD device 100, frame sections 104 and 106 and collector electrodes 130 of collector array 120 have a height of approximately 3 mm, corona discharge electrode 110 may be a bare or coated tungsten wire having a diameter of about 12.5 µm, collector electrodes 130 in collector array 120 have a width (thickness) of about 0.25 mm and are spaced approximately 3 mm apart on center, and the distance, d, between corona discharge electrode 110 and collector electrodes 130 is approximately 1.6 mm. The voltage applied across the air gap between corona discharge electrode 110 and collector electrodes 130 may be in the range of 1.5 kV to 4 kV.

Figure 3B:
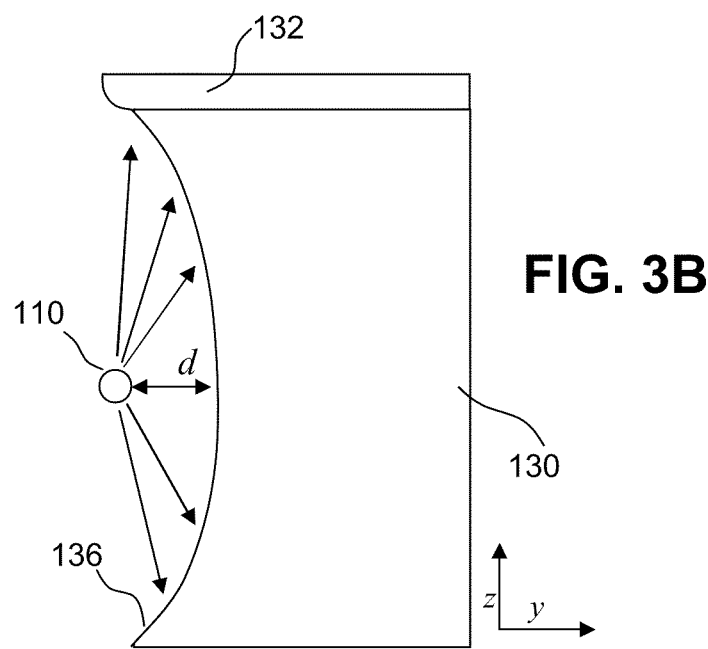
FIG. 3B is a simplified cross-sectional view of the corona discharge electrode and a single collector electrode in accord with the leading surface profile illustrated FIG. 3A.

FIG. 3B is a simplified cross-sectional view of corona discharge electrode 110 and a single collector electrode 130 instance in accord with the curved leading surface profiles illustrated FIG. 3A. In particular, FIG. 3B illustrates a side elevation view of collector electrode 130. In operation, when an electric field is created between corona discharge electrode 110 and collector electrode 130, ions generally flow in the directions of the electric field lines represented by the arrows. Curved leading surface 136 may provide certain enhancements to the operation of EHD device 100. For example, as demonstrated by 3D electrical field simulations performed on a corona discharge electrode and collector electrode configuration similar to that illustrated in FIG. 3B, utilizing a generally curved leading surface 136 for instances of collector electrode 130 may allow for a shorter distance, d, between corona electrode 110 and collector electrode 130, while at the same time increasing ion production and assisting in preventing sparks and arcing. In addition, utilizing curved surface 136 for collector electrode 130 may provide electrical separation between adjacent corona discharge electrodes in some embodiment described elsewhere herein that gang multiple EHD device instances.

Simulation Analysis

Figure 13A:
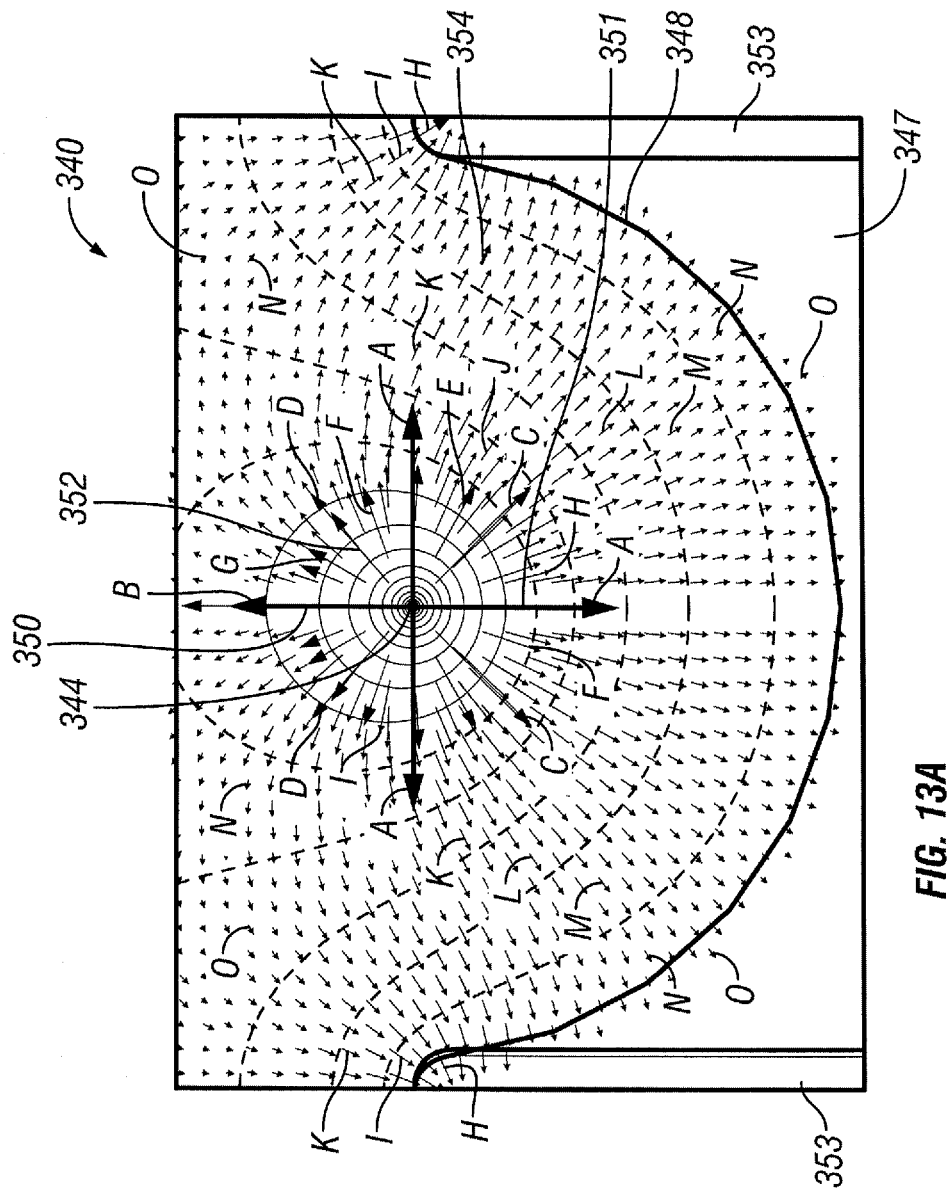
FIGS. 13A, 13B and 13C illustrate simulation plots of electric field characteristics for a variety of illustrative geometries and operational pairings of corona discharge and collector electrodes. In particular.
Figure 13B:
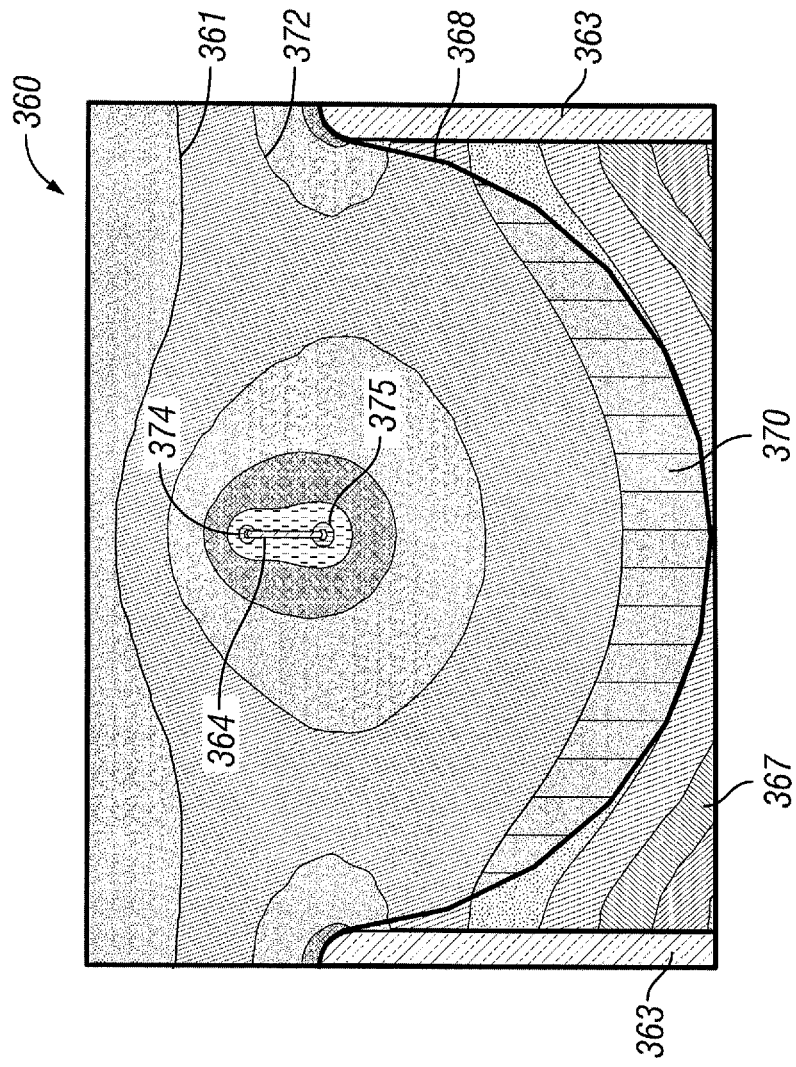
Figure 13C:
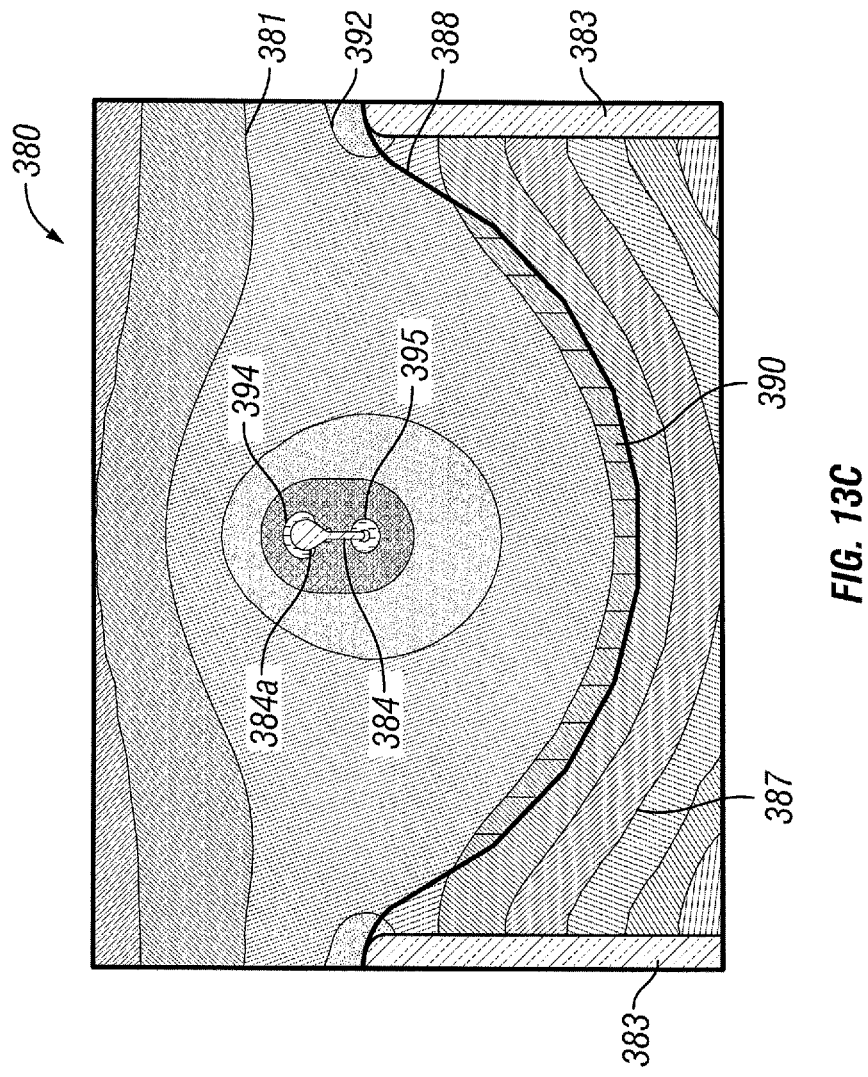
Figure 13C:
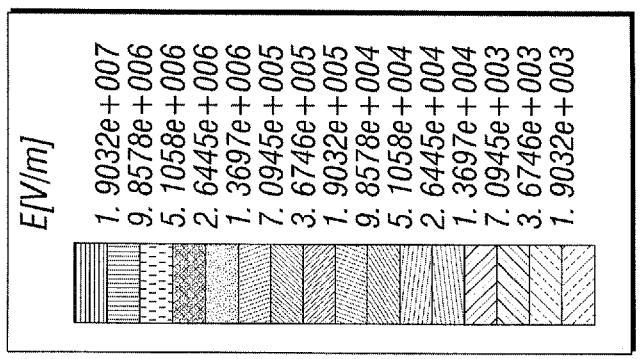

FIGS. 13A, 13B and 13C illustrate simulation plots of electric field characteristics for a variety of illustrative geometries and operational pairings of corona discharge and collector electrodes. In particular, FIG. 13A is a simulation plot of electric field strength and equal potential surfaces for a representative configuration in which a collector electrode having a generally circular curved leading surface profile is paired with a corona discharge wire electrode positioned equidistant from all points along the curved leading surface of the collector electrode.

Simulation plot 340 illustrates the direction and distribution of the electric field using conventional symbology in which the length and direction of an arrow emanating from a given point code strength and direction of the field at that point. Equipotential surfaces are also illustrated. More specifically, simulation plot 340 illustrates electric field characteristics when a voltage is applied between a wire-type corona discharge electrode 344 and a collector electrode 347 having circular profile 348 which distributes the electric field over a larger surface. Modeled collector electrode 347 is shown spanning a distance between two frame or support sections 353.

In general, the amplitude of the electric field at a particular location is represented by shading and length of arrows. For example, arrows (e.g., arrows 350 and 351) emanating from points close to corona discharge electrode 344 indicate the highest electric field strength. Arrows emanating from points further from corona discharge electrode 344 (e.g., arrow 352) indicate points where the electric field of lesser strength, while arrows emanating from points much further from corona discharge electrode 344 (e.g., arrow 354) indicate points where the electric field of significantly lower strength. The ion movement follows the electric field lines represented by the arrows in simulation plot 340. It will be appreciated that contoured collector electrode 347 tends to increases the travel distance of ions following the steeped electric field gradients, which in the illustration of FIG. 13A provides a net flow direction generally aligned with arrow 351.

This increased distance can increase the efficiency of the momentum exchange between the ions and air molecules and may be an advantage of some curved leading surface designs. However, it should be noted that, in the results illustrated in FIG. 13A, electric field lines tend to collect (and a large gradient exists) at the uppermost surfaces of modeled collector electrode 347 where it joins support sections 353. The large gradient suggests an increased likelihood of arcing between corona discharge electrode 344 and the top portion of support sections 353.

Like the collector electrode illustrated in FIG. 3B, modeled collector electrode 347 presents a curved leading surface; however, the unlike collector electrode 130 and unlike the configuration illustrated in FIG. 3B, the modeled configuration positions modeled corona discharge electrode 344 and modeled collector electrode 347 so that points along the curved leading surface of modeled collector electrode 347 are equidistant from corona discharge electrode 344.

FIG. 13B presents a modeled configuration in which the wire-type corona discharge electrode is replaced with a blade type configuration. For simplicity, FIG. 13B illustrates equal potential contours but omits the corresponding electric field lines. In simulation plot 360, the gradient of the electric field at a particular location is shown by the closeness of the equal potential contour lines. Examples of equal potential contour lines are lines 361 and 372 in FIG. 13B or lines 381 and 392 in FIG. 13C. The more closely spaced contour lines indicate a steeper (or larger) electric field gradient. In FIG. 13B, simulation plot 360 is based on a blade-shaped corona discharge electrode 364 paired with a collector electrode 367 having a circular curved surface 368. As before, collector electrode 367 is shown spanning a distance between two frame or support sections 363. Area 370 represents the gradient of the electric field at surface 368 of collector electrode 367. The fact that area 370 is substantially not uniform in width (i.e., distance between plot lines) indicates that the electric field gradient is non-uniform at surface 368. In addition, the electric field has a large gradient as it approaches each of support sections 363, as indicated by contour line 372. The large gradient at support sections 363 suggests a higher likelihood of arcing between corona discharge electrode 364 and the top portion of support sections 363.

In contrast, FIG. 13C is a simulation plot of equal potential contours for a configuration in which a collector electrode presents a generally parabolic leading surface profile. Corona discharge electrode 384 presents a bulbous leading profile and small radius of curvature trailing cross section. As before, the collector electrode (here collector electrode 387) spans a distance between two frame or support sections (here support sections 383), though with a curved profile that, unlike that illustrated in FIGS. 13A and 13B, places a center portion of collector electrode 387 at a minimum distance from corona discharge electrode 384 and presents portions of the generally parabolic leading surface profile that extend outward toward support sections 383 at increasing distances therefrom.

Area 390 represents the gradient of the electric field at surface 388 of collector electrode 387. It can be seen that, in contrast to plot 360, area 390 is more uniform in width, indicating that the electric field gradient is substantially more uniform across surface 388. In addition, it can be seen from simulation plot 380 that a comparatively smaller gradient exists at the top of support sections 383, as indicated by contour line 392, in comparison to that shown in plot 360. The lower gradient at support sections 383 suggests a lower likelihood of arcing between corona discharge electrode 384 and the top portion of support sections 383. Thus, in some embodiments of the EHD devices illustrated herein, it may be desirable to provide a generally curved surface of a collector electrode, such as that provided by parabolic curved surface 388, which may provide increasing inter-electrode distance at portions of the collector electrode extending away from a minimum distance point (here at the central axis).

With continued reference to FIGS. 13B and 13C, plots 360 and 380 also illustrate an operational characteristic of the corona discharge electrode. The shape of corona discharge electrode 384 in plot 380 is different from the shape of corona discharge electrode 364 in plot 360. While this difference in shape has no (or at least negligible) effect on the electric field gradient at the surface of the collector electrode, as discussed above, the shape of the corona discharge electrode may either adversely or positively effect the operation of the EHD device. In plot 260, blade-shaped corona discharge electrode 364 has the same thickness from top to bottom. This profile forms two regions 374 and 375 of high electric field gradient, indicated by the closeness of contour lines on both top and bottom ends of electrode 364. Both of these regions are two corona discharge regions. Top corona region 374 reduces EHD device efficiency because the ion movement direction away from collector electrode 367 is against the air flow direction. In contrast, corona discharge electrode 384 has a "teardrop" shape; specifically, top region 384a of electrode 384 has a larger radius of curvature than the bottom end facing the collector electrode. Plot 380 shows that this shape reduces the electric field gradient at top region 384a, as indicated by contour line 394, relative to high electric field gradient region 395. The teardrop shape, therefore, limits the corona discharge from top end 384a of corona discharge electrode 384, and improves device efficiency.

Exemplary Curved Leading Surface Profiles for Collector Electrodes

Figure 15:
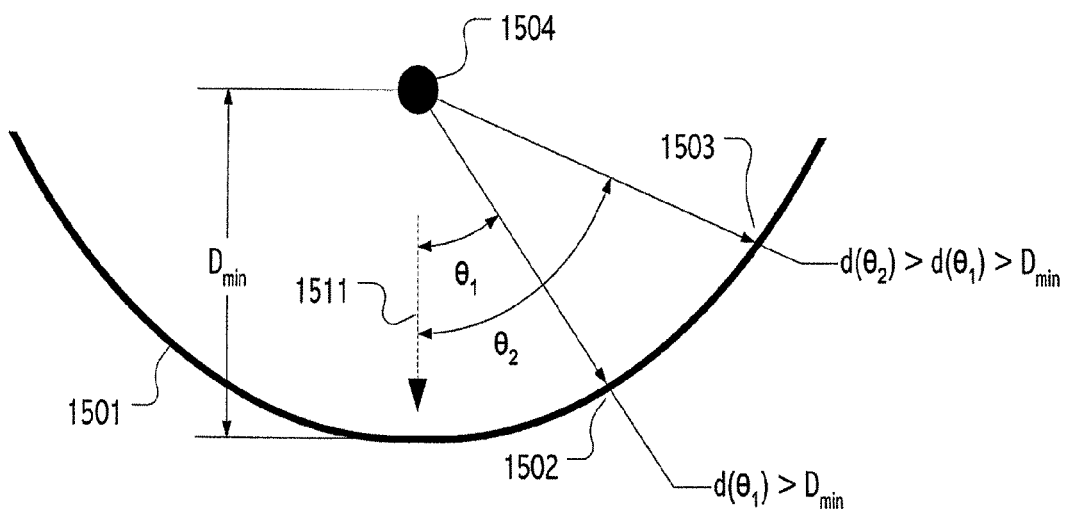
FIGS. 15, 16, 17 and 18 illustrate a variety of electrode configurations and geometries for EHD devices in accordance with some embodiments of the present invention and in which points that are at increasing angular distance along curved leading surfaces of respective collector electrodes are at increasing distance from a corona discharge electrode. In particular.

Consistent with the foregoing simulations, FIGS. 15, 16, 17 and 18 illustrate a variety of electrode configurations and geometries for EHD devices in accordance with some embodiments of the present invention and in which points that are at increasing angular distance from a dominant fluid flow direction along curved leading surfaces of respective collector electrodes are at increasing distance from a corona discharge electrode. In particular, FIG. 15 illustrates a generally parabolic leading surface profile 1501 for a collector electrode (such as collector electrode 130, recall FIG. 3B) in which points 1502, 1503 at increasing angular distances ($\theta_1$, $\theta_2$) from an axis 1511 are at increasing distances ($d(\theta_1)$, $d(\theta_2)$) from a corona discharge electrode 1504. A nearest point along generally parabolic leading surface profile 1501 is at a minimum distance $D_{min}$ from corona discharge electrode 1504.

Figure 16:
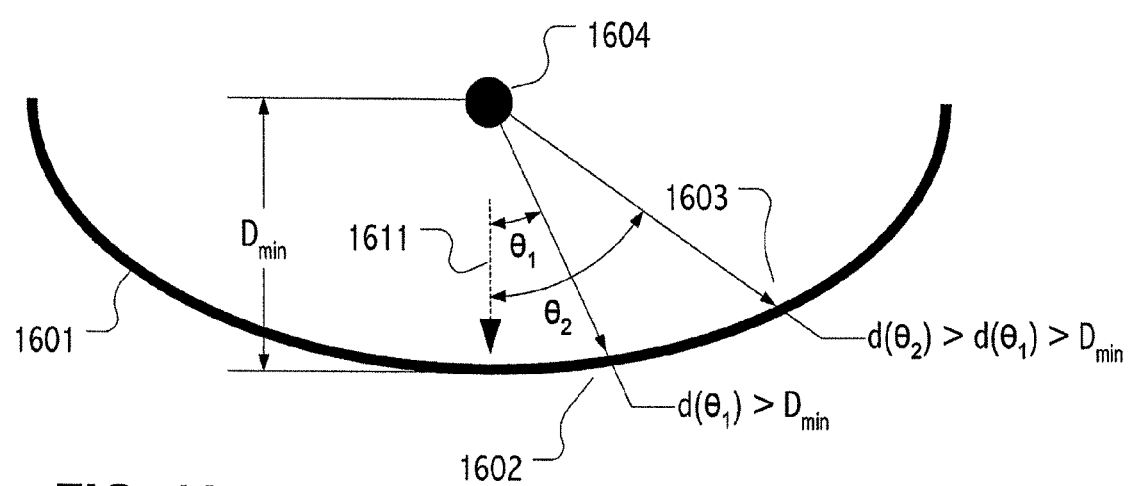

FIG. 16 illustrates a generally elliptical leading surface profile in which points at increasing angular distance are at increasing distance from a corona discharge electrode. As before, a leading surface profile 1601 for a collector electrode (such as collector electrode 130) exhibits points 1602, 1603 at increasing angular distance ($\theta_1$, $\theta_2$) from an axis 1611 that are at increasing distances ($\theta_1$), $d(\theta_2$)) from a corona discharge electrode 1604. A nearest point along generally parabolic leading surface profile 1601 is at a minimum distance $D_{min}$ from corona discharge electrode 1604.

Figure 17:
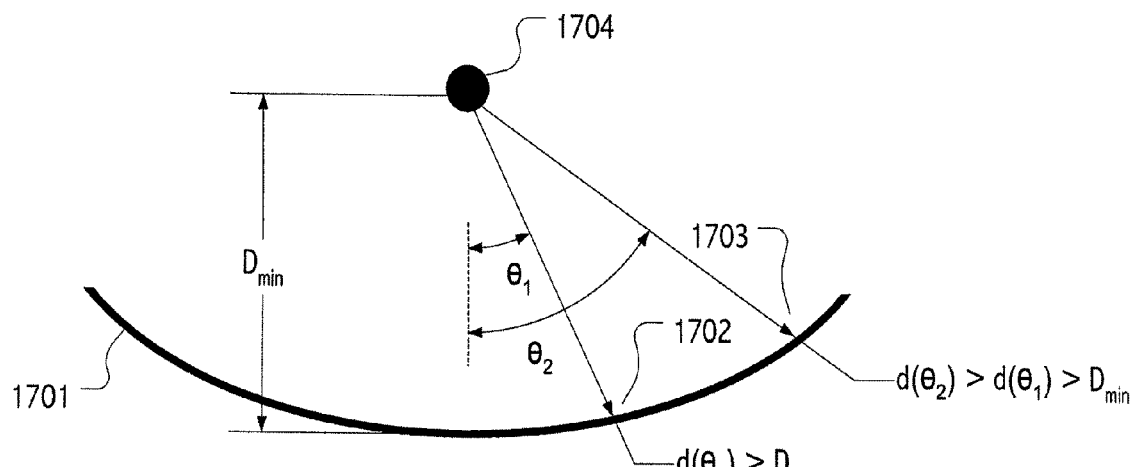
Figure 18:
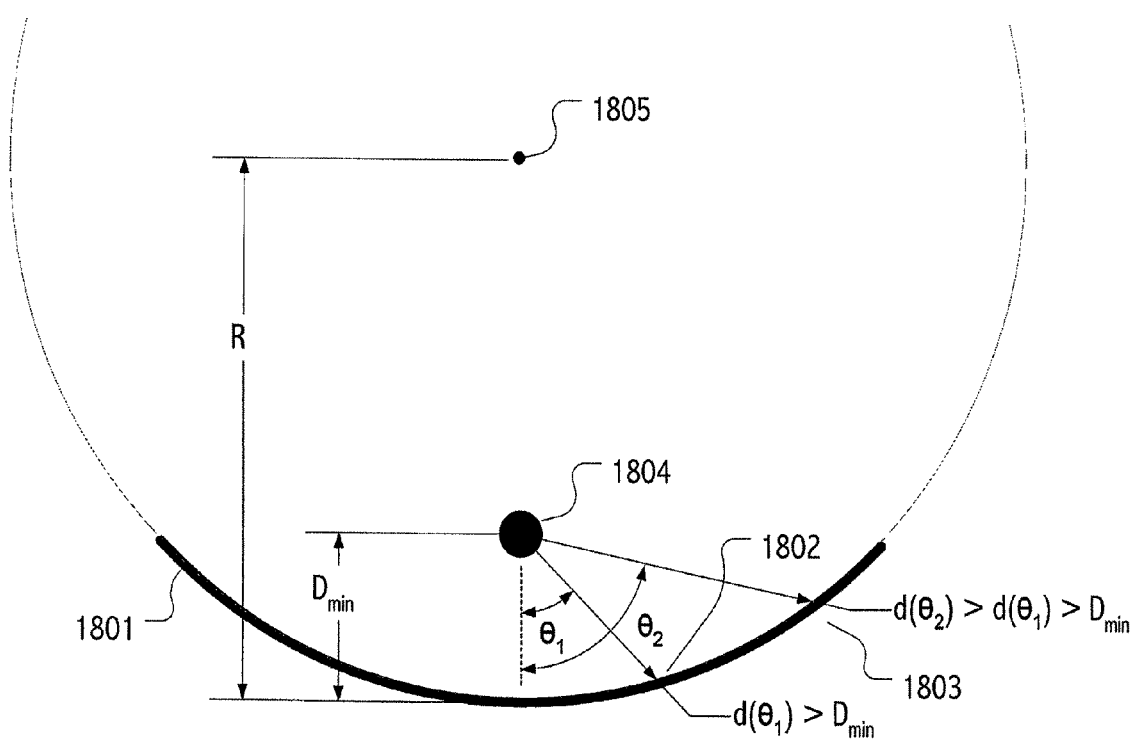

FIG. 17 illustrates a generally curved leading surface profile 1704 for a collector electrode displaced from a corona discharge electrode so that points 1702, 1703 at increasing angular distance ($\theta_1$, $\theta_2$) from an axis are at increasing distances ($d(\theta_1)$, $d(\theta_2)$) from corona discharge electrode 1704. In general any of a variety of curved surface profiles (e.g., parabolic, elliptical, circular, caternary, etc.) may be employed. FIG. 18 illustrates, in particular, a circular leading surface profile 1801 for a collector electrode having a radius of curvature, R, substantially greater than a minimum distance, $D_{min}$, between corona discharge and a nearest point on the collector electrode. As before, the leading surface profile 1801 exhibits points 1802, 1803 at increasing angular distances ($\theta_1$, $\theta_2$) from an axis that are at increasing distances ($d(\theta_1)$, $d(\theta_2)$) from the corona discharge electrode (here corona discharge electrode 1804).

Additional Embodiments and Design Variations

Figure 14A:
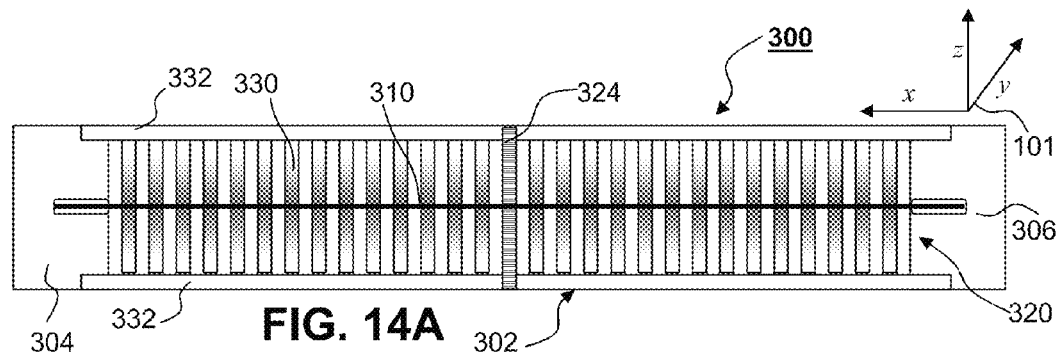
FIG. 14A is a side view of an EHD device in accordance with some embodiments of the present invention.

FIG. 14A is a side view of an EHD device 300, which is a variation of corona discharge electrode 110 and collector electrode array 120 of EHD device 100 previously described with reference to FIG. 2. EHD device 300 has a width in the x-direction greater than that shown for EHD device 100. EHD device 300 comprises first and second opposing frame members 304 and 306 that function to hold, or support, corona discharge electrode 310 and collector electrode array 320. Collector array 320 comprises a plurality of substantially parallel unit structures 330 attached to a pair of parallel and substantially flat, spaced apart support members 332. As before, individual unit structures 330 may be understood to constitute collector electrodes. Also as before, individual collector electrodes exhibit curved leading surfaces such as described above.

Figure 14B:
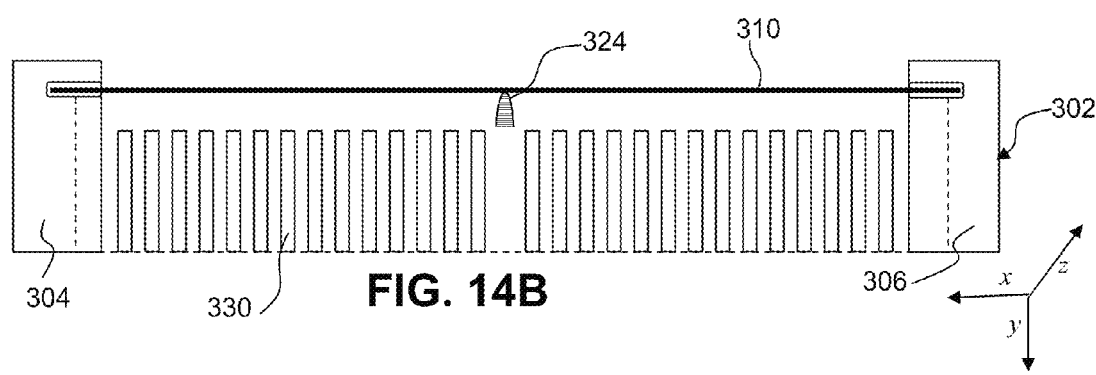
FIG. 14B is a cross-sectional view of the EHD device illustrated in FIG. 14A.

During operation of the EHD device 300, corona discharge electrode 310 may lose some of its initial tension and may sag downward toward collector electrode array 320. Support member 324 provides a resting place for corona discharge electrode 310 and maintains a substantially equal distance of corona discharge electrode 310 from unit structures 330 during operation of EHD device 300. Support member 324 may be made of a dielectric material in order to provide the necessary electrical isolation from other components of EHD device 300. FIG. 14B is a cross-sectional view of the EHD device illustrated in FIG. 14A and illustrate a curved or rounded profile for support member 324. The curved or rounded profile of support member 324 tapers from a narrow profile proximate to corona discharge electrode 310 to a broader profile proximate to collector electrode array 320. This profile may function to decrease the electric field gradient in the vicinity of support member 324, thereby decreasing the risk of arcing proximate to support member 324. In a variation of the embodiment shown in FIG. 14B, curved or rounded support member 324 need not extend so far as to contact corona discharge electrode 324; instead, the extent of support member 324 may be such that it provides a gap between the support member and corona discharge electrode 324, thereby providing a lower resting place for corona discharge electrode 324 should it sag during operation of EHD device.

Figure 4:
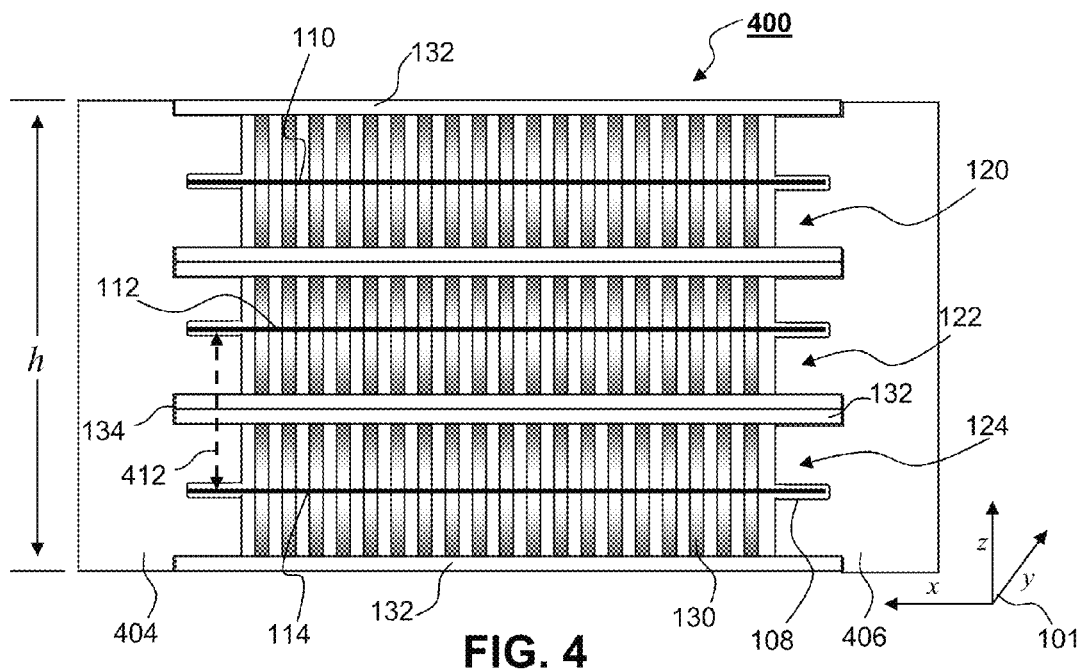
FIG. 4 is a side view of an EHD device configuration in accordance with some embodiments of the present invention and in which multiple assemblies are ganged to increase total volume of fluid flow.

FIG. 4 is a side view of an EHD device configuration in accordance with some embodiments of the present invention and in which multiple assemblies are ganged to increase total volume of fluid flow. A first, or front, surface of EHD device 400 is situated in a three-dimensional coordinate system 101 in which the x-y plane respectively designates the width and depth of device 400 and the z direction designates the height, h, of device 400. In FIG. 4, device 400 motivates flow of a fluid in the y direction; that is, fluid is drawn into the first, or front, surface of device 400 shown in FIG. 4 and exits a rear surface, opposite the first surface, not shown in FIG. 4.

EHD device 400 comprises a plurality of corona discharge electrodes and associated collector electrode arrays of the type described with respect to EHD device 100 of FIG. 2, assembled in a single housing or frame. The presentation in FIG. 4 of EHD device 400 as having three EHD device 100 assemblies is solely for the sake of illustration, and is not intended to be limiting in any way. EHD device 400 comprises first and second opposing frame members 404 and 406 that function to hold, or support, corona discharge electrodes 110, 112 and 114 and associated collector electrode arrays 120, 122 and 124. Each frame member 104 and 106 comprises a plurality of recesses 108. An opposing end of each corona discharge electrode 110, 112 and 114 passes through a recess 108 in each of the opposing frame members and is attached to an interior portion (not shown) of a respective frame member.

Corona discharge electrodes 110, 112 and 114 in device 400 have small radii of curvature and, in some embodiments, may take the form of wire or rods. Other shapes are also possible; for example, corona discharge electrodes 110, 112 and 114 may take the shape of barbed wire, a band, blade or, in some embodiments, may present a knife- or serrated-edge. In some embodiments, a cross-section such as illustrated in FIG. 1 for electrode 10 (or as illustrated with reference to the simulation plot of FIG. 13C) may be employed. As noted with respect to EHD device 100 of FIG. 2, corona discharge electrodes 110, 112 and 114 may likewise be fabricated in a wide range of materials. A high voltage power supply that creates the electric field between corona discharge electrodes 110, 112 and 114 and respective collector electrode arrays 120, 122 and 124 will be understood, but is not separately shown in FIG. 4.

With continued reference to FIG. 4, each collector electrode array 120, 122 and 124 comprises a plurality of substantially parallel unit structures 130 attached to a pair of parallel and substantially flat, spaced apart support members 132. Support members 132 are disposed within openings 134 in frame sections 404 and 406. Each unit structure 130 functions as a collector electrode and may generally have greater depth (in the y direction) than width (in the x direction). Unit structures 130 may be fabricated of any suitable metal material; aluminum, for example, may be chosen for its low cost, good electrical and thermal conductivity, and for its ease in forming a desired shape. Unit structures 130 may be substantially rectangular in shape, or may be formed in other shapes. As before, individual unit structures 330 may be understood to constitute collector electrodes. Also as before, individual collector electrodes exhibit any of a variety of curved leader surfaces such as described above.

In one exemplary implementation of EHD device 400, frame sections 404 and 406 may have a height, h, of approximately 9 mm, and the distance 412 between adjacent corona discharge electrodes 112 and 114 may be approximately 4 mm.

Figure 5:
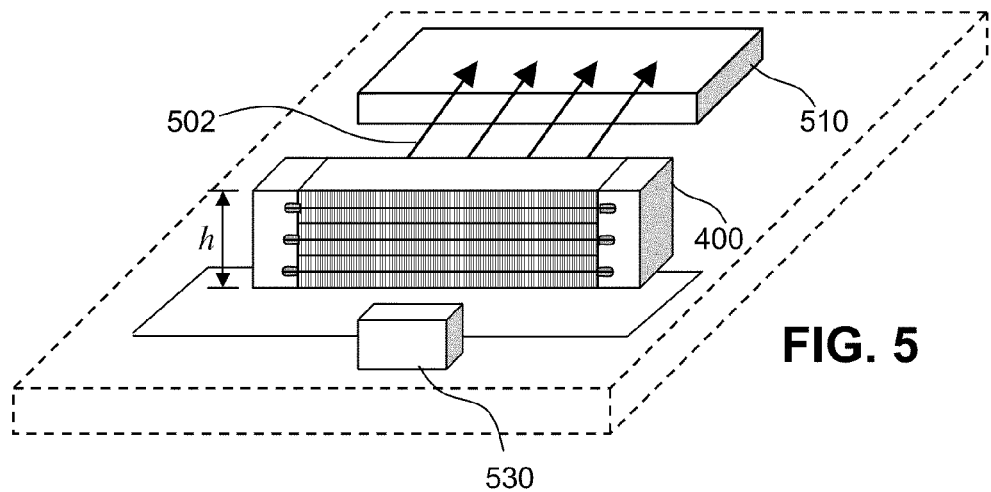
FIG. 5 is a schematic block diagram illustrating a configuration in which an EHD device in accordance with some embodiments of the present invention may be used.

FIG. 5 schematically illustrates an environment in which devices such as EHD device 100 of FIG. 2 and EHD device 400 of FIG. 4 may operate. EHD device 400 or EHD device 100 may be positioned proximate to an electronic circuit 510 (or other heat source) that generates heat during its operation. Note that electronic circuit 510 may also be in thermal contact with a heat sink or other thermal management device (not shown) positioned above, below or adjacent to electronic circuit 510. As defined herein, a heat sink is an object that absorbs and dissipates heat from another object using either direct or radiant thermal contact. In operation, high voltage power supply 530 is operated to create a voltage difference between corona discharge electrodes 110, 112 and 114 (FIG. 4) and collector electrode arrays 120, 122 and 124, generating an ion stream (as described with respect to FIG. 1) that moves ambient air toward collector electrode arrays 120, 122 and 124. The resulting air movement over and around electronic circuit 510 dissipates heat in the air above and around electronic circuit 510. Note that the position of power supply 530 relative to EHD device 400 and electronic circuit 510 may vary from that shown in FIG. 5. Also, note that while FIG. 5 illustrates flow toward electronic circuit, in some configurations flow may also (or alternatively) be drawn past an electronic circuit or heat sink.

Figure 6:
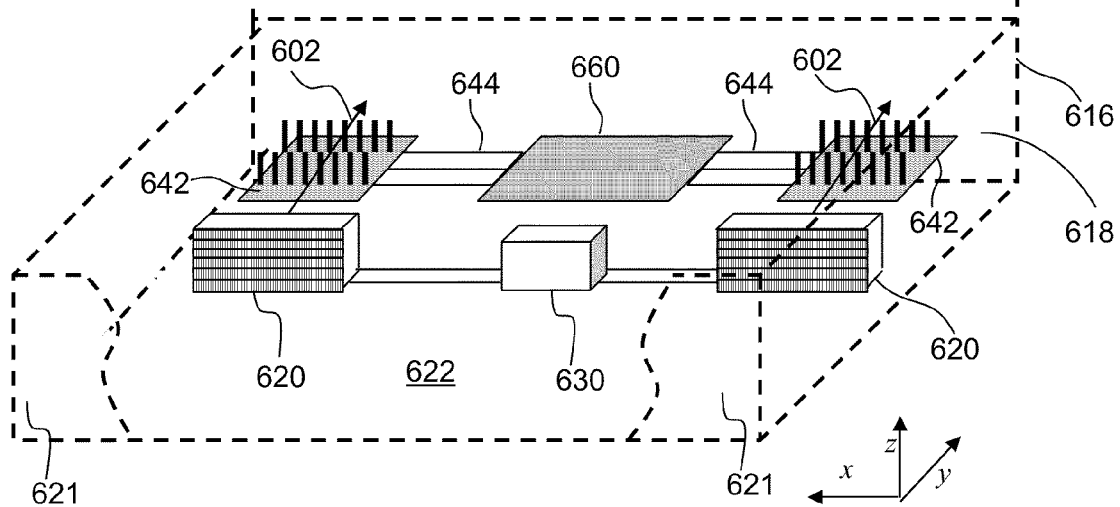
FIG. 6 is a schematic block diagram illustrating another configuration in which EHD devices in accordance with some embodiments of the present invention may be used.

FIG. 6 is a schematic block diagram illustrating a second environment in which devices such as EHD device 100 of FIG. 2 and EHD device 400 of FIG. 4 may operate. Electronic device 600 comprises a substantially rectangular housing 616, or case, having a cover 610 that includes a display device 612. A portion of the front surface 621 of housing 620 has been cut away to reveal interior 622. Housing 620 of electronic device 600 may also comprise a top surface not shown in FIG. 6 that supports one or more input devices that may include, for example, a keyboard, touchpad and tracking device. Electronic device 600 further comprises electronic circuit 660 which generates heat in operation. A thermal management solution comprises heat pipes 644 that draw heat from electronic circuit 660 to heat sink devices 642. Further shown in interior 622 of electronic device 600 is a pair of EHD devices 620 which may represent EHD device 100 of FIG. 2, EHD device 400 of FIG. 4 or a variation of either device as described above. Each one of a pair of EHD devices 620 is powered by high voltage power supply 630 and is positioned proximate to one of the heat sinks 642. Electronic device 600 may also comprise many other circuits, depending on its intended use; to simplify illustration of this second embodiment, other components that may occupy interior area 622 of housing 620 have been omitted from FIG. 6.

With continued reference to FIG. 6, in operation, high voltage power supply 630 is operated to create a voltage difference between the corona discharge electrodes and collector electrode arrays disposed in each EHD device 620, generating an ion stream (as described with respect to FIG. 1) that moves ambient air toward the collector electrode arrays. The moving air leaves EHD device 620 in the direction of arrows 602, traveling through the protrusions of heat sinks 642 and through an exhaust grill or opening (not shown) in the rear surface 618 of housing 620, thereby dissipating heat accumulating in the air above and around heat sinks 642. Note that the position of power supply 630 relative to EHD devices 620 and electronic circuit 660 may vary from that shown in FIG. 6. Note also that other flow topologies may be supported.

In a variation of the operating environment shown in FIG. 6, each EHD device 620 may be supplied with voltage from its own dedicated power supply.

Figure 7:
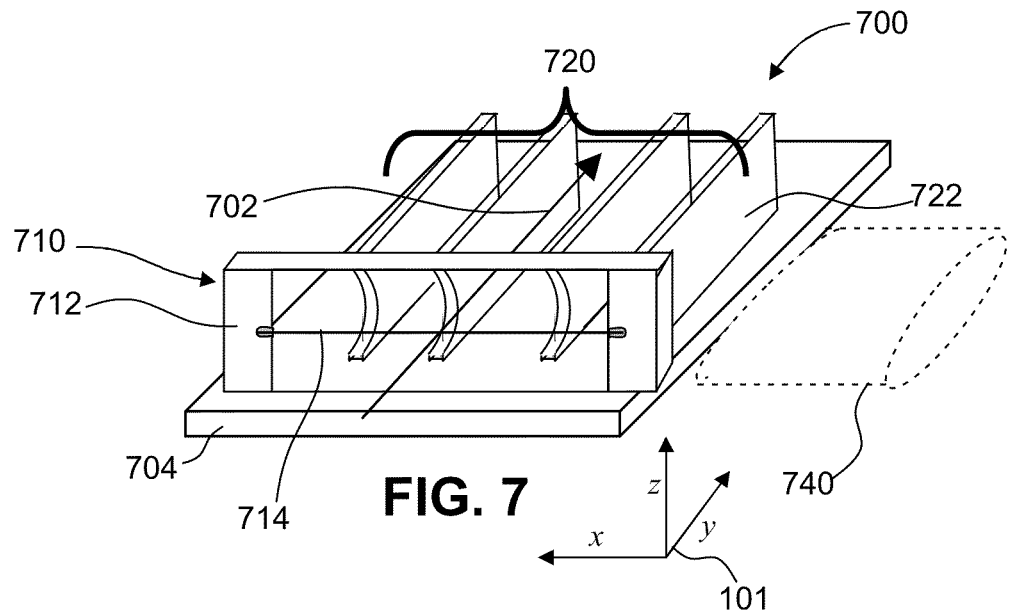
FIG. 7 is a perspective view of an EHD device in accordance with some embodiments of the present invention and in which collector electrodes are thermally coupled to a heat source.

FIG. 7 is a schematic diagram of a second embodiment of an EHD device. EHD device 700 comprises corona discharge electrodes 714 supported in frame 712. Collector electrode array 720 comprises individual unit structures 722 that function both as collector electrodes and components of a heat sink. The leading edge of each individual unit structure 722 closest to corona discharge electrode array 710 exhibits a curved leading surface, such as curved surface 136 illustrated in FIG. 3A or any of the curved leading surfaces described with reference to FIGS. 15-18. A high voltage power supply (not shown) provides electrical energy to corona discharge electrode 714 and to collector electrode array 720. In operation, an ion stream generated by corona discharge electrode 714, according to the corona discharge principles illustrated in FIG. 1, produces fluid movement in the direction of arrow 702 between unit structures 722 of collector electrode array 720. Collector electrode array 720 may be positioned proximate to a heat pipe 740 that transfers heat from an electronic circuit or other heat source not specifically shown in FIG. 7. The components of EHD device 700 may be assembled on surface 704 which may be a thermally conductive substrate for transferring heat from heat pipe 740 to collector electrode array 720. EHD device 700 and surface 704 may be fabricated in a wide range of sizes, according to the specifications of a particular thermal management application. When corona discharge electrode 714 is fabricated as described for EHD device 400 of FIG. 4, EHD device 700 may have a height (z direction) in the range of 0.5 mm to 30 mm, and thus may be suitable for use in an electronic device having a thin form factor. Note that the scale of the individual components shown in FIG. 7 is solely for illustration purposes; each component may have height, width and depth dimensions that are different from the relative dimensions shown in the Figure.

Embodiments of EHD Devices with Stages

Figure 8A:
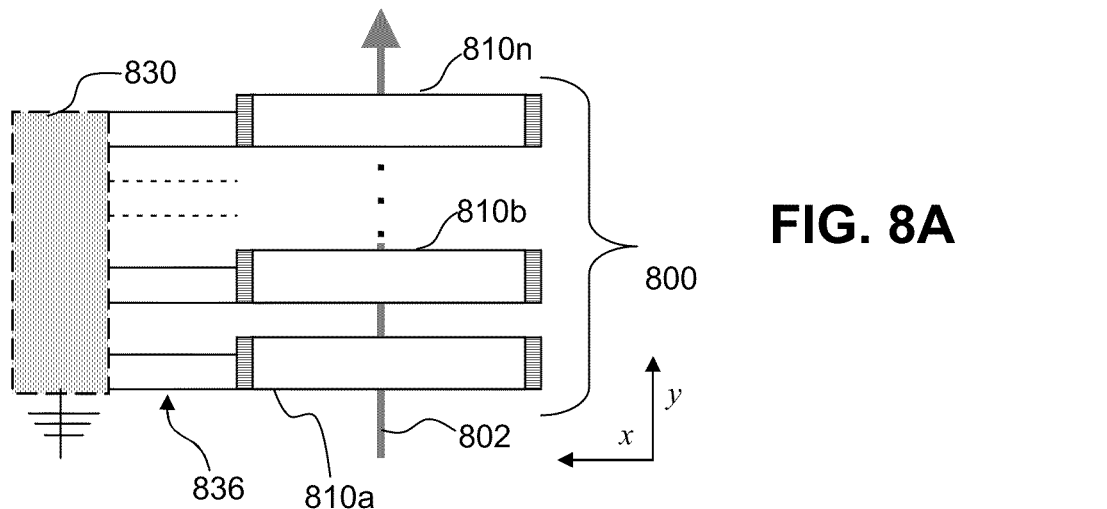
FIG. 8A is a schematic block diagram illustrating the components of a multi-stage EHD device.

FIG. 8A is a schematic block diagram illustrating the components of a multi-stage EHD device 800. Individual EHD devices 810a, 810b through 810n, each of which is referred to individually herein as EHD device stage 810n, are disposed in parallel and orthogonal to a desired air flow direction 802. High voltage power supply 830 is connected to each individual EHD device stage 810n by way of electrical conductors 836. Individual EHD device stage 810n may comprise any one EHD device 100 of FIG. 2, EHD device 400 of FIG. 4, or EHD device 700 of FIG. 7, or variations of those devices as described above. In a variation of multi-stage EHD device 800, high voltage power supply 830 may comprise a set of individual power supplies, each one coupled to an individual EHD device stage 810. In operation, each individual EHD device stage 810n may be operated simultaneously and synchronously with the others in order to produce increased volume and pressure of air flow in the direction of arrow 802, thereby sequentially accelerating a fluid through the multiple stages. Synchronous operation of EHD device stages 810n is defined herein to mean that a single power supply, or multiple synchronized and phase-controlled power supplies, provide high voltage power to each EHD device stage 810n such that both the phase and amplitude of the electric power applied to the same type of electrodes in each stage (i.e., the corona discharge electrodes or the collector electrodes) are aligned in time.

U.S. Pat. No. 6,727,657, entitled "Electrostatic Fluid Accelerator for and a Method of Controlling a Fluid Flow" (hereafter, "the '657 patent") provides a discussion of the configuration and operation of multi-stage EHD devices. U.S. Pat. No. 6,727,657 is incorporated by reference herein in its entirety for all that it teaches. In particular, the '657 patent discloses that increasing electrode density, defined as stages-per-unit-length, and eliminating or significantly decreasing stray currents between neighboring stages is accomplished, in part, by powering neighboring EHD stages with substantially the same voltage waveform, i.e., the potentials on the neighboring electrodes have the same or very similar alternating components so as to eliminate or reduce any a.c. differential voltage between stages. Operating in such a synchronous manner between stages, electrical potential differences between neighboring electrodes of adjacent EHD stages remains constant and any resultant stray current from one electrode to another is minimized or completely avoided.

Synchronization among the EHD device stages may be implemented by different means, but most easily by powering neighboring EHD device stages with respective synchronous and syn-phased voltages from one or more power supplies, or with power supplies synchronized to provide similar amplitude a.c. components of the respective applied voltages. This may be achieved with the same power supply connected to neighboring EHD stages or with different, preferably matched power supplies that produce a synchronous and syn-phased a.c. component of the applied voltage. In one embodiment, a suitable power supply may comprise a plurality of converters for transforming a primary power to high voltage power, with each converter being independently connected to a respective one of the EHD device stages for providing high voltage power thereto. A suitable power supply may further comprise a controller connected to the converters for synchronizing the alternating components of the high voltage power provided by each converter.

Figure 8B:
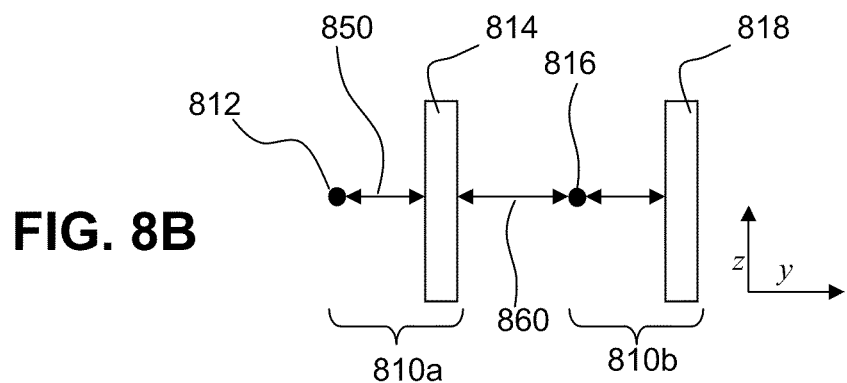
FIG. 8B is a block diagram illustrating distance relationships between two stages of the multi-stage EHD device of FIG. 8A, used in some embodiments to determine an effective distance between successive stages in the multi-stage EHD device.

FIG. 8B schematically illustrates a first embodiment for computing a suitable inter-stage distance. As applied to FIG. 8B herein, the '657 patent discloses that the distance 850 between corona discharge electrode 812 and collector electrode 814 of EHD device stage 810a may be comparable to the distance 860 between the trailing edge of collector electrode 814 and corona discharge electrode 816 of subsequent EHD device stage 810b; that is, the closest distance between elements of adjacent stages is not much greater than the distance between electrodes within the same stage. In one embodiment, the inter-stage distance 860 between collector electrode 814 and corona discharge electrode 816 of the adjacent stage may be between 1.2 and 2.0 times that of the intra-stage spacing distance 850 between corona discharge electrode 812 and collector electrode 814 (or, similarly, the distance between corona discharge electrode 816 and collector electrode 818) within the same stage. For illustration purposes only, in FIG. 8B, distance 860 is shown as being approximately 1.4 times distance 850. Because of this consistent spacing, capacitance between EHD device stage electrode pair 812 and 814 and between inter-stage corona electrode pair 812 and 816 are of the same order.

The '657 patent further explains that the closest spacing of electrodes of adjacent EHD device stages may be approximated as follows. A typical EHD device operates efficiently over a rather narrow voltage range. The voltage $V_c$ applied between the corona discharge and collecting electrodes of the same stage should exceed the so-called corona onset voltage $V_{onset}$ for proper operation. That is, when voltage $V_c$ is less than $V_{onset}$, no corona discharge occurs and no air movement is generated. At the same time $V_c$ should not exceed the dielectric breakdown voltage $V_b$ so as to avoid arcing. Depending on electrode geometry and other conditions, $V_b$ may be more than twice as much as $V_{onset}$. For typical electrode configurations, the $V_b/V_{onset}$ ratio is about 1.4-1.8 such that any particular corona discharge electrode should not be situated at a distance from a neighboring collecting electrode where it may generate a "back corona." Therefore, the normalized distance "aNn" between the closest electrodes of neighboring stages may be at least 1.2 times greater than the normalized distance "aNc" between the corona discharge and the collecting electrodes of the same stage but not more than 2 times greater than distance "aNc." That is, electrodes of neighboring stages may be spaced so as to ensure that a voltage difference between the electrodes is less than the corona onset voltage between any electrodes of the neighboring stages. Thus, the voltage frequency and phase control discussed above allow neighboring EHD stages to be closely spaced at a distance of from 1 to 2 times an inter-electrode distance within a stage.

Figure 8C:
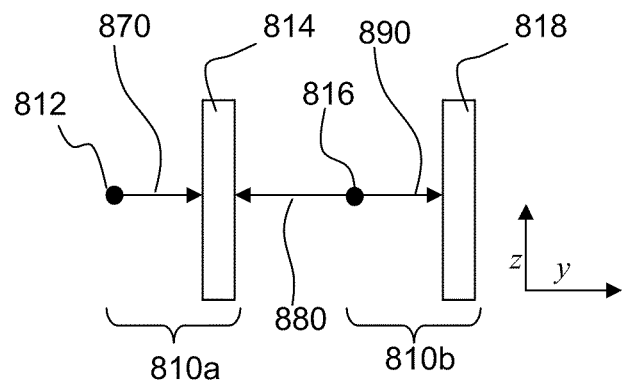
FIG. 8C is a block diagram representing current relationships between two stages of the multi-stage EHD device of FIG. 8A used in some embodiments to determine an effective distance between successive stages in the multi-stage EHD device.

FIG. 8C schematically illustrates a second embodiment for computing a suitable inter-stage distance between upstream EHD device stage 810a and downstream EHD device stage 810b positioned in the same plane as upstream EHD device stage 810a, designated respectively in the mathematical notation that follows as the "A" unit and the "B" unit. In FIG. 8C, arrows 870, 880 and 890 indicate ionic current flows; specifically, arrows 870 and 890 indicate current flows $I_{AF}$ and $I_{BF}$ to collector electrodes in the respective A and B units, and arrow 880 indicates a current flow $I_{BR}$ to the collector electrode of unit A upstream of unit B. A suitable inter-stage distance between upstream EHD device stage 810a and downstream EHD device stage 810b may be computed as a distance that satisfies the relationship $$\frac{I_{BF}}{I_{BR}} > Z$$

where Z should be greater than 1, and for high efficiency operation, Z should be greater than 100.

Figure 9:
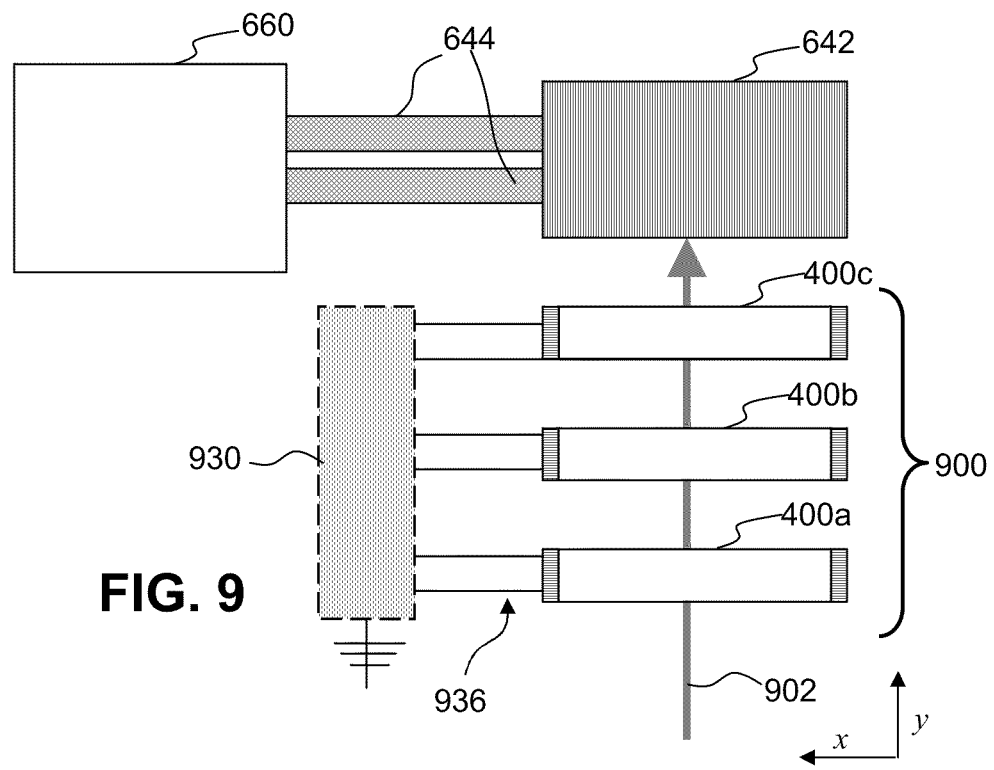
FIG. 9 is a schematic block diagram illustrating an operating configuration for some multi-stage EHD device embodiments in accordance with the present invention.

FIG. 9 is a block diagram of a multi-stage EHD device 900, of the type illustrated in FIG. 8, utilizing individual EHD devices 400 of FIG. 4, designated in the Figure as EHD device stages 400a, 400b and 400c. Multi-stage EHD device 900 is implemented in the operating environment of the electronic device 600 of FIG. 6, as shown by the reference to components 660, 644 and 642 of FIG. 6. Heat generated by the operation of electronic circuit 660 is drawn through heat pipes 644 to heat sink device 642. EHD device stages 400a, 400b and 400c are disposed in a parallel arrangement and orthogonal to air flow direction 902 toward heat sink 642. in operation, high voltage power supply 930 produces a voltage differential between respective pairs of corona discharge electrodes and collector electrodes in each EHD device stage 400a, 400b and 400c, via conductors 936, as described above with respect to FIG. 8, in order to generate an ion stream (as described with respect to FIG. 1) that moves ambient air toward the collector electrode arrays in each EHD device stage. The moving air exits EHD device stage 400c in the direction of arrow 902, traveling through the protrusions of heat sink 642 and through an exhaust grill or opening (not shown) in the rear surface of electronic device 600 (FIG. 6), thereby dissipating heat accumulating in the air above and around heat sink 642. Note that the position of power supply 930 relative to EHD device stages 400a, 400b and 400c and electronic circuit 660 may vary from that shown in FIG. 9. Note also that each EHD device stage 400a, 400b and 400c may be supplied with voltage from its own dedicated power supply, each of which may be operated as disclosed in the '657 patent.

Figure 10A:
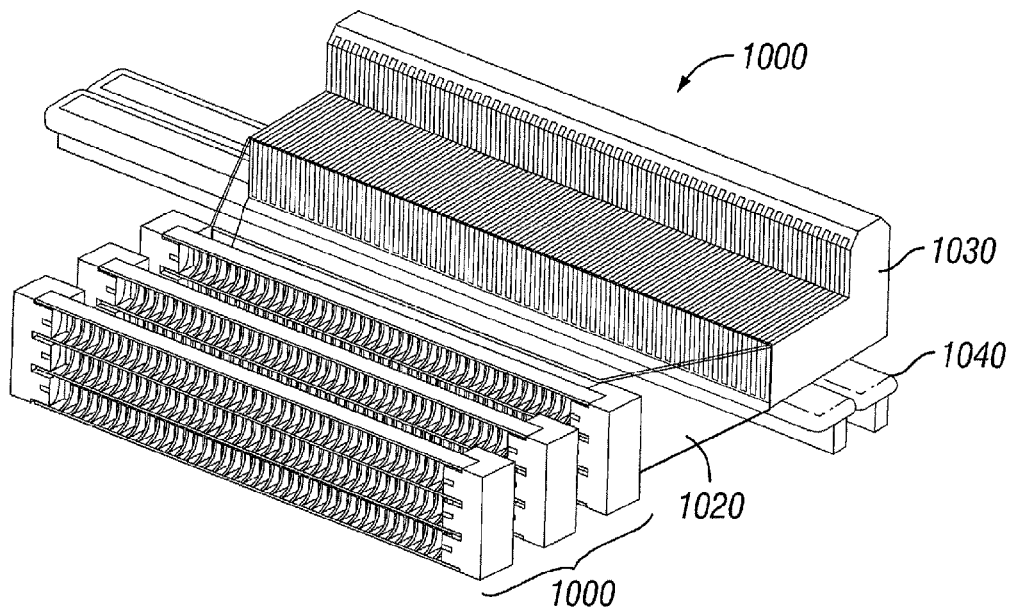
FIG. 10A depicts an embodiment of a multi-stage EHD device in accord with FIG. 9.
Figure 10B:
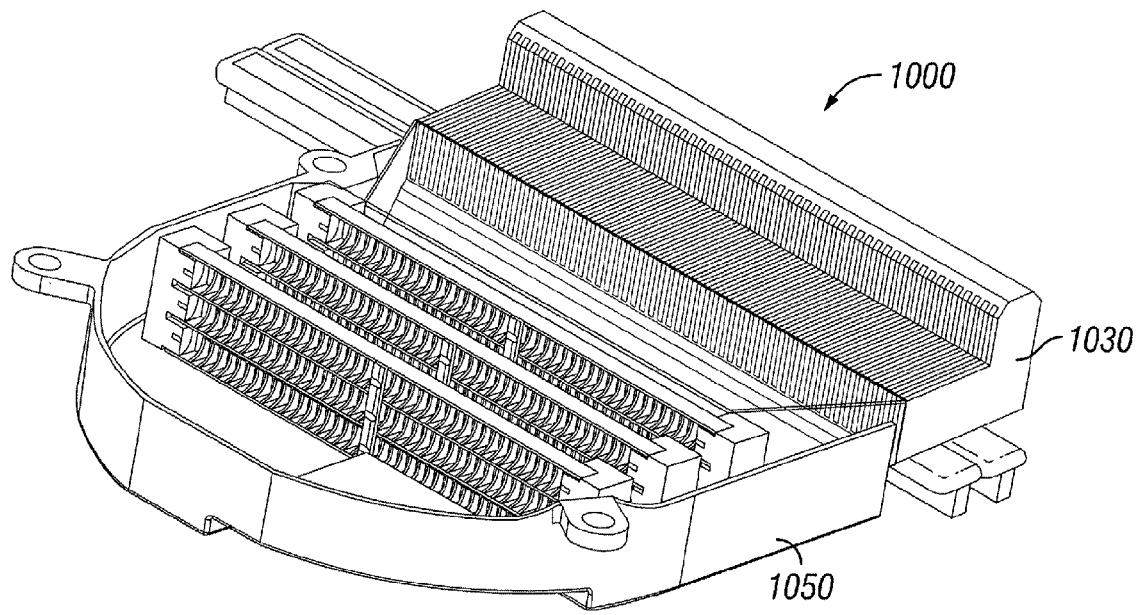
FIG. 10B depicts a further embodiment of a multi-stage EHD device in accord with FIG. 9 and in which may be suitable for use as a direct replacement for a conventional rotary fan ventilated heat exchanger design such as employed in some laptop computer designs.

FIG. 10A depicts an illustration of one embodiment of device 900 of FIG. 9. Multi-stage EHD device 1000 comprises three EHD device stages 1010 which accelerate a fluid such as air through duct 1020 into heat sink 1030. Heat sink 1030 receives heated air from heat pipe 1040 that draws the heated air from an electronic circuit not shown in the Figure. In FIG. 10B, multi-stage EHD device 1000 is shown positioned within curved frame 1050. In one implementation of multi-stage EHD device 1000, curved frame 1050 resides in the interior of a laptop computer and has the dimensions of approximately 55 mm in width, 50 mm in depth, and 4 mm in height. The volume encompassed by curved frame 1050 is sufficient to hold a low-profile axial fan for use in pushing air toward heat sink 1030 in order to dissipate heat generated by an electronic circuit not shown in the Figure. In FIG. 10B, multi-stage EHD device 1000 is shown as a direct replacement for the fan.

Figure 11:
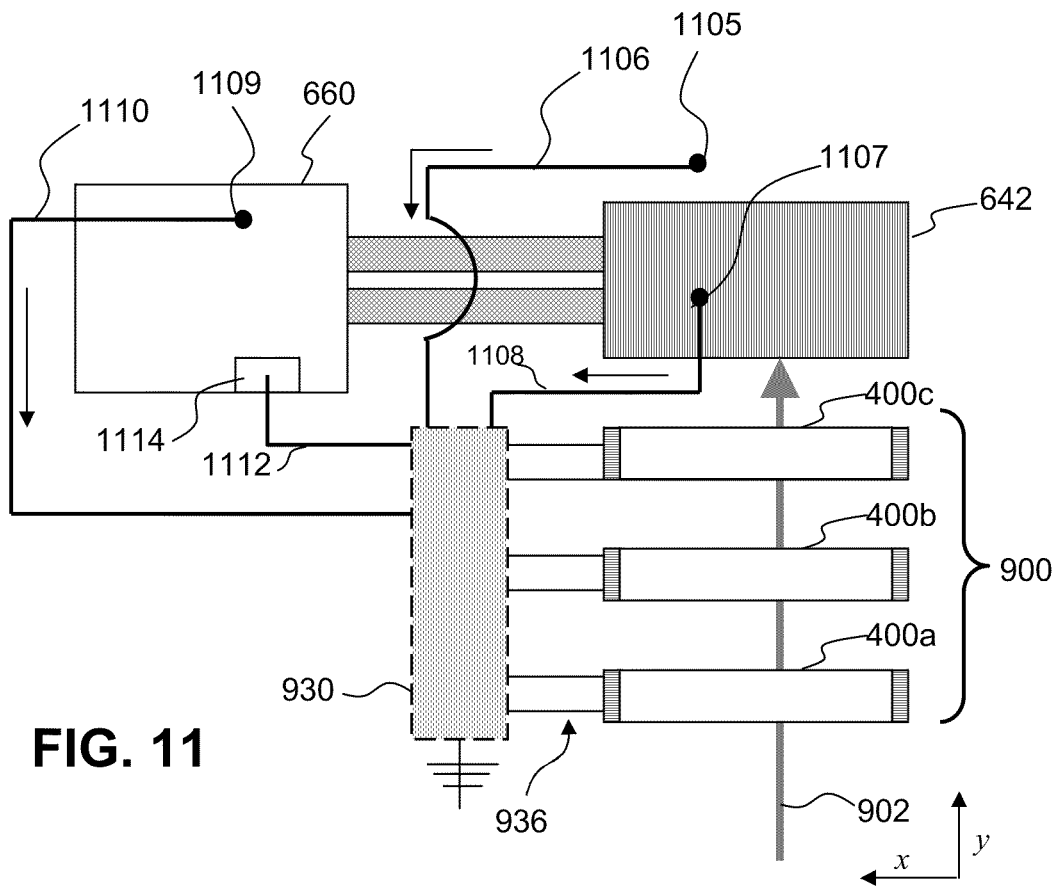
FIG. 11 is a schematic block diagram illustrating an operating configuration for some multi-stage EHD device embodiments in accordance with the present invention and in which a temperature sensor feedback system is provided.

FIG. 11 is a block diagram of multi-stage EHD device 900 of FIG. 9 including one embodiment of a temperature sensor feedback system comprising temperature sensors 1105, 1107 and 1109. In the embodiment illustrated in FIG. 11, temperature sensor 1107 positioned internally in heat sink 642 sends temperature data along electrical connection 1108 to a control unit in power supply 930; temperature sensor 1105 positioned at the exhaust end of heat sink 642 sends temperature data along electrical connection 1106 to the control unit in power supply 930; and temperature sensor 1109 positioned in electronic circuit 660 sends temperature data along electrical connection 1110 to the control unit in power supply 930. In response to the temperature data received, the control unit of power supply 930 may adjust the operation of EHD device stages 400a, 400b and 400c via electrical connectors 936. In one embodiment, the control unit of power supply 930 may also adjust the operation of electronic circuit 660 by sending control signals to circuit 1114 along electrical connector 1112 in response to received temperature data.

Figure 12:
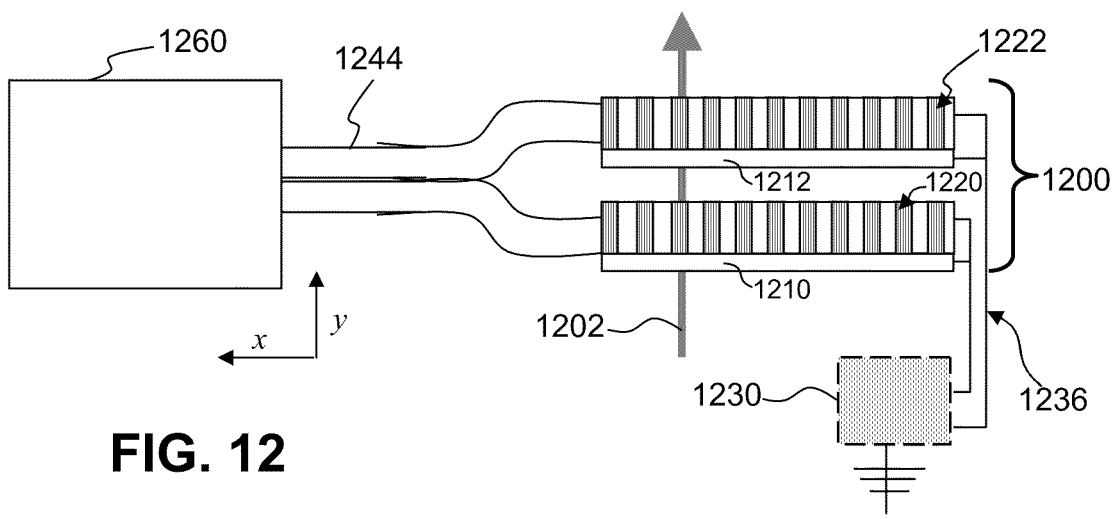
FIG. 12 is a schematic block diagram illustrating a multi-stage EHD device in accordance with some embodiments of the present invention and in which collector electrodes are thermally coupled to the heat source.

FIG. 12 is a block diagram of a multi-stage EHD device 1200, of the type illustrated in FIG. 8, utilizing individual EHD devices of the type illustrated in FIG. 7 in which the collector electrode arrays 1220 and 1222 comprise individual unit structures that function both as collector electrodes and heat sink fins. Each collector electrode array 1220 and 1222 is paired with a respective corona discharge electrode array 1210 and 1212. Heat generated by the operation of electronic circuit 1260 is drawn through heat pipes 1244 which divide into two portions that direct heated air separately to each EHD device stage. The EHD device stages are placed in series and disposed in a parallel arrangement and orthogonal to air flow direction 1202. Note that the scale of the individual components shown in FIG. 12 is solely for illustration purposes; each component may have height, width and depth dimensions that are different from the relative dimensions shown in the Figure. In addition, the number of stages may be more or less than shown in FIG. 12.

With continued reference to FIG. 12, in operation, high voltage power supply 1230 produces a voltage differential between respective pairs of corona discharge electrodes and collector electrodes in each EHD device stage, via conductors 1236, as described above with respect to FIG. 8, in order to generate an ion stream (as described with respect to FIG. 1) that moves ambient air toward collector electrode arrays 1220 and 1222 in each EHD device stage. The moving air dissipates heat that collects within collector electrode arrays 1220 and 1222 in each EHD device stage as it moves in the direction of arrow 1202. Note that the position of power supply 1230 relative to the EHD device stages and electronic circuit 1260 may vary from that shown in FIG. 12. In a variation of the embodiment shown in FIG. 12, each EHD device stage may be supplied with voltage from its own dedicated power supply, each of which may be operated as disclosed in the '657 patent.

While the techniques and implementations of the EHD devices discussed herein have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. An electrohydrodynamic fluid accelerator comprising:
at least one corona discharge electrode having first and second ends and having a longitudinal extent spanning a distance between the first and second ends;
an array of collector electrodes, the collector electrodes spaced apart and each having a generally planar portion oriented orthogonally to the longitudinal extent of the corona discharge electrode, the collector electrodes each presenting a curved leading profile displaced from the corona discharge electrode, the collector electrodes and the corona discharge electrode operatively coupled between terminals of a high voltage source to establish a corona discharge therebetween,
wherein (i) the curved leading profiles are contoured and (ii) the collector electrodes and the corona discharge electrode are positioned with respect to each other such that all points along a respective one of the curved leading profiles are not equidistant from the corona discharge electrode, and instead a single point along the respective curved leading profile is at a minimum distance, d, from the corona discharge electrode and all additional points in either direction away from the single point along the respective curved leading profile are at increasing distance, >d, from the corona discharge electrode.

2. The electrohydrodynamic fluid accelerator of claim 1, wherein the respective curved leading profile at least approximates a parabolic profile and has an axis of symmetry, and
wherein the corona discharge electrode is positioned along the axis of symmetry.

3. The electrohydrodynamic fluid accelerator of claim 1, wherein the respective curved leading profile at least approximates one of a circular, catenary and parabolic profile, the respective curved leading profile having an axis of symmetry and
wherein the corona discharge electrode is positioned at the axis of symmetry.

4. The electrohydrodynamic fluid accelerator of claim 1, configured to motivate flow of a fluid past heat transfer surfaces thermally coupled to heat source.

5. The electrohydrodynamic fluid accelerator of claim 4, wherein the heat transfer surfaces include at least some of the spaced apart collector electrodes.

6. The electrohydrodynamic fluid accelerator of claim 4, wherein the spaced apart collector electrodes constitute at least a substantial portion of the heat transfer surfaces.

7. The electrohydrodynamic fluid accelerator of claim 4, wherein the fluid includes air.

8. The electrohydrodynamic fluid accelerator of claim 4, wherein the thermal coupling includes one or more heat pipes.

9. The electrohydrodynamic fluid accelerator of claim 1, wherein the corona discharge electrode exhibits a cross section over at least a substantial portion of its longitudinal extent, the exhibited cross section being one of:
a circular cross section;
a blade-type cross section;
a cross section that includes a bulbous leading profile; and
a teardrop cross section.

10. The electrohydrodynamic fluid accelerator of claim 1, further comprising:
at least one additional corona discharge electrode.

11. The electrohydrodynamic fluid accelerator of claim 1, configured as one of plural staged instances thereof, wherein a successor one of the staged instances further accelerates flow of fluid received from a prior one of the staged instances.

12. The electrohydrodynamic fluid accelerator of claim 1, configured as one of plural instances thereof ganged to contribute to volume of fluid flow.

13. An electrohydrodynamic fluid accelerator comprising:
a corona discharge electrode;
plural collector electrodes, each thermally coupled to a heat source, the collector electrodes and the corona discharge electrode operatively coupled between terminals of a high voltage source to establish a corona discharge therebetween and motivate flow of a fluid over the plural collector electrodes and, based on the motivated fluid flow, to dissipate heat,
wherein each of the plural collector electrodes presents a generally curved leading surface to an impinging electric field associated with the corona discharge, and
wherein points along the generally curved leading surface in either direction away from a nominal fluid flow axis are at increasing distance from the corona discharge electrode.

14. The electrohydrodynamic fluid accelerator of claim 13, wherein the points along the generally curved leading surface are not equidistant from the corona discharge electrode.

15. The electrohydrodynamic fluid accelerator of claim 13, wherein the curved leading surfaces presented by the collector electrodes are non-circular.

16. The electrohydrodynamic fluid accelerator of claim 13, wherein the curved leading surfaces presented by the collector electrodes are uniform and selected from the set of parabolic, elliptical, and catenary profiles.

17. The electrohydrodynamic fluid accelerator of claim 13, wherein a point along the generally curved leading surface at minimum distance from the corona discharge electrode is aligned with the nominal fluid flow axis.

18. The electrohydrodynamic fluid accelerator of claim 17, wherein the curved leading surfaces presented by the collector electrodes are circular and positioned such that the minimum distance is less than a radius of the circular curved leading surfaces.

19. An electrohydrodynamic fluid accelerator comprising:
plural corona discharge electrodes;
collector electrodes each presenting a curved leading surface to an impinging electric field associated with corona discharge from a respective one of the corona discharge electrodes,
wherein points along the generally curved leading surface in either direction away from a nominal fluid flow axis are at increasing distance from the respective corona discharge electrode.

20. The electrohydrodynamic fluid accelerator of claim 19, configured as plural stages each employing at least one of the corona discharge electrodes to motivate flow, wherein a successor stage further accelerates flow of fluid received from a prior one of the stages.

21. The electrohydrodynamic fluid accelerator of claim 19, wherein plural subassemblies each employing at least one of the corona discharge electrodes to motivate flow are ganged to contribute to volume of fluid flow.

* * * * *